(12) United States Patent
Wang et al.

(10) Patent No.: US 12,001,375 B2
(45) Date of Patent: Jun. 4, 2024

(54) INTERCONNECT SYSTEM

(71) Applicant: Shanghai Zhaoxin Semiconductor Co., Ltd., Shanghai (CN)

(72) Inventors: Weilin Wang, Beijing (CN); Xiaoliang Kang, Shaanxi Province (CN); Xuemin Zhang, Shanghai (CN); Chen Chen, Beijing (CN); Yang Shi, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 65 days.

(21) Appl. No.: 17/523,049

(22) Filed: Nov. 10, 2021

(65) Prior Publication Data

US 2023/0101918 A1    Mar. 30, 2023

(30) Foreign Application Priority Data

Sep. 28, 2021  (CN) .......................... 202111141627.5
Sep. 28, 2021  (CN) .......................... 202111142578.7
Sep. 28, 2021  (CN) .......................... 202111142579.1
Sep. 28, 2021  (CN) .......................... 202111142604.6

(51) Int. Cl.
*G06F 13/42* (2006.01)
*G06F 1/3234* (2019.01)
(Continued)

(52) U.S. Cl.
CPC ........ *G06F 13/4265* (2013.01); *G06F 1/3234* (2013.01); *G06F 9/4418* (2013.01); *G06F 9/4812* (2013.01); *G06F 13/1668* (2013.01); *G06F 13/4027* (2013.01); *G06F 13/4068* (2013.01); *G06F 15/7807* (2013.01);
(Continued)

(58) Field of Classification Search
CPC ............. G06F 13/4027; G06F 13/1668; G06F 13/4208; G06F 13/4282; H04L 1/004; H04L 45/02; H04L 45/22; H04L 45/42; H04L 45/745; H04L 69/324
See application file for complete search history.

(56) References Cited

U.S. PATENT DOCUMENTS 9,929,928 B1     3/2018  Dekoos
10,339,059 B1 *  7/2019  Mattina ............... G06F 12/0822
(Continued)

OTHER PUBLICATIONS

Non-Final Office Action issued in U.S. Appl. No. 17/506,144, filed Oct. 20, 2021, mailed Nov. 25, 2022.
(Continued)

*Primary Examiner* — Nimesh G Patel
(74) *Attorney, Agent, or Firm* — McClure, Qualey & Rodack, LLP

(57) ABSTRACT

A interconnect system, including a plurality of sockets and a first interconnect interface. Any two of the sockets are accessible to each other's hardware resources by transmitting a first packet and a second packet through the first interconnect interface. The first packet includes first interconnect information, used for establishing communication between the two sockets. The second packet includes a first data payload, loaded from one of the two sockets. The sockets include a first socket and a second socket, configured to be interconnected with each other through the first interconnect interface.

23 Claims, 22 Drawing Sheets

(51) Int. Cl.
*G06F 9/4401* (2018.01)
*G06F 9/48* (2006.01)
*G06F 13/16* (2006.01)
*G06F 13/40* (2006.01)
*G06F 15/78* (2006.01)
*H04L 1/00* (2006.01)
*H04L 45/00* (2022.01)
*H04L 45/02* (2022.01)
*H04L 45/42* (2022.01)
*H04L 45/745* (2022.01)
*H04L 69/324* (2022.01)

(52) U.S. Cl.
CPC .......... *G06F 15/7825* (2013.01); *H04L 1/004* (2013.01); *H04L 45/02* (2013.01); *H04L 45/22* (2013.01); *H04L 45/42* (2013.01); *H04L 45/745* (2013.01); *H04L 69/324* (2013.01); *G06F 13/4208* (2013.01); *G06F 13/4282* (2013.01)

(56) References Cited

U.S. PATENT DOCUMENTS

| | | | |
|---|---|---|---|
| 10,505,851 | B1 | 12/2019 | Matthews et al. |
| 11,526,460 | B1 * | 12/2022 | Wang .................. G06F 13/4265 |
| 11,569,939 | B1 * | 1/2023 | Krishnamurthy ..... H04L 1/0061 |
| 2003/0225737 | A1 | 12/2003 | Matthews |
| 2008/0209298 | A1 | 8/2008 | Chae et al. |
| 2010/0002589 | A1 | 1/2010 | Ciordas et al. |
| 2010/0191894 | A1 | 7/2010 | Bartley et al. |
| 2012/0290864 | A1 | 11/2012 | Seroff |
| 2013/0057338 | A1 | 3/2013 | Venkatraman |
| 2014/0177473 | A1 | 6/2014 | Kumar et al. |
| 2015/0263949 | A1 | 9/2015 | Roch et al. |
| 2016/0239461 | A1 * | 8/2016 | Kavipurapu .......... G06F 9/4494 |
| 2017/0060212 | A1 | 3/2017 | Kaushal et al. |
| 2017/0171618 | A1 | 6/2017 | Fryer et al. |
| 2017/0185449 | A1 | 6/2017 | Zhang et al. |
| 2018/0189222 | A1 | 7/2018 | Srivastava |
| 2018/0276139 | A1 * | 9/2018 | Wysoczanski ........ G06F 12/123 |
| 2019/0044916 | A1 | 2/2019 | Jones |
| 2020/0153757 | A1 * | 5/2020 | Bharadwaj ........... H04L 49/109 |
| 2020/0326771 | A1 | 10/2020 | Wu |
| 2020/0393891 | A1 | 12/2020 | Baggett |
| 2021/0306257 | A1 | 9/2021 | Dutta |
| 2021/0326277 | A1 * | 10/2021 | Kee ......................... G06F 13/28 |
| 2022/0019552 | A1 | 1/2022 | Wilkinson et al. |
| 2022/0045948 | A1 | 2/2022 | Shen et al. |
| 2022/0058151 | A1 * | 2/2022 | Woo ....................... G06N 3/063 |

OTHER PUBLICATIONS

Notice of Allowance dated Oct. 26, 2022, issued in U.S. Appl. No. 17/511,800.

Saponara, S., et al.; "Configurable network-on-chip router macrocells;" Microprocessors and Microsystems 45; 2016; pp. 141-150.

Wang, N., et al.; "Traffic Allocation: An Efficient Adaptive Network-on-Chip Routing Algorithm Design;" 2nd IEEE International Conference on Computer and Communications; 2016; pp. 2015-2019.

Non-Final Office Action dated Mar. 27, 2023, issued in U.S. Appl. No. 17/506,124.

Final Office Action dated Jun. 22, 2023, issued in U.S. Appl. No. 17/506,124.

* cited by examiner

INTERCONNECT SYSTEM

CROSS REFERENCE TO RELATED APPLICATIONS

This application claims priority of China Patent Application No. 202111142579.1, filed on Sep. 28, 2021, China Patent Application No. 202111142604.6, filed on Sep. 28, 2021, China Patent Application No. 202111142578.7, filed on Sep. 28, 2021, and China Patent Application No. 202111141627.5, filed on Sep. 28, 2021, the entirety of which is incorporated by reference herein.

BACKGROUND OF THE INVENTION

Field of the Invention

The present disclosure relates to the field of integrated circuits (IC), especially to a interconnect system.

Description of the Related Art

Conventional transmission is implemented by PCI Express (PCIe).

However, the PCIe bandwidth at the transmission terminal is usually inconsistent with the PCIe bandwidth at the receiving terminal, causing the problem of data congestion and failing to fully utilize the transmission bandwidth during the data transmission.

Apart from considering the performance of data transmission, the subtle circuit design and the ultimate space utilization are also cutting-edge issues.

Therefore, there is a need for a interconnect system with low delay, high bandwidth utilization, and high space utilization.

BRIEF SUMMARY OF THE INVENTION

An embodiment of the present disclosure provides a interconnect system, including a plurality of sockets and a first interconnect interface. Any two of the sockets are accessible to each other's hardware resources by transmitting a first packet and a second packet through the first interconnect interface. The first packet includes first interconnect information, used for establishing communication between the two sockets. The second packet includes a first data payload, loaded from one of the sockets. The sockets include a first socket and a second socket, configured to be interconnected with each other through the first interconnect interface.

In some embodiments, the first packet further includes a first header and a first check code. The first header is used for indicating attributes of the first interconnect information. The first check code is used for checking the correctness of the first interconnect information.

In some embodiments, the number of bits of the first interconnect information is fixed.

In some embodiments, the second packet further includes a second header and a second check code. The second header is used for indicating attributes of the first data payload. The second check code is used for checking the correctness of the first data payload.

In some embodiments, the number of bits of the first data payload when the first interconnect interface is congested is bigger than the number of bits of the first data payload when the first interconnect interface is not congested.

In some embodiments, each of the sockets includes a plurality of dies and a second interconnect interface. Any two of the dies are accessible to each other's hardware resources by transmitting a third packet through the second interconnect interface. The dies includes a first die and a second die, and the first die and the second die are configured to be interconnected with each other through the second interconnect interface. The third packet includes second interconnect information and a second data payload. The second interconnect information is used for establishing communication between the two the dies. The second data payload is loaded from one of the dies.

In some embodiments, the third packet includes a third header and a third check code. The third header is used for indicating attributes of the second data payload and the second interconnect information. The third check code is used for checking the correctness of the second data payload and the second interconnect information.

In some embodiments, the number of bits of the second data payload and number of bits of the second interconnect information are fixed.

In some embodiments, hardware resources include a last-level cache (LLC). The first packet and the second packet are used for maintaining cache coherency between the LLCs of any two sockets.

In some embodiments, sockets further include a third socket. The first socket and the third socket are configured to be interconnected with each other through the first interconnect interface. The second socket and the third socket are configured to be interconnected with each other through the first interconnect interface.

In some embodiments, sockets further include a third socket and a fourth socket. The first socket and the third socket are configured to be interconnected with each other through the first interconnect interface. The second socket and the fourth socket are configured to be interconnected with each other through the first interconnect interface. The first socket, the second socket, the third socket, and the fourth socket are all on a first plane.

In some embodiments, the first socket and the fourth socket are configured to be interconnected with each other through the first interconnect interface. The second socket and the third socket are configured to be interconnected with each other through the first interconnect interface.

In some embodiments, sockets further include a fifth socket and a sixth socket. The first socket and the fifth socket are configured to be interconnected with each other through the first interconnect interface. The fourth socket and the fifth socket are configured to be interconnected with each other through the first interconnect interface. The fifth socket and the sixth socket are configured to be interconnected with each other through the first interconnect interface. The second socket and the sixth socket are configured to be interconnected with each other through the first interconnect interface. The third socket and the sixth socket are configured to be interconnected with each other through the first interconnect interface. The fifth socket is on a second plane, and the sixth socket is on a third plane. The first plane, the second plane, and the third plane are parallel with one another, and the first plane is between the second plane and the third plane.

In some embodiments, sockets further include a fifth socket, a sixth socket, a seventh socket, and an eighth socket. The fifth socket and the sixth socket are configured to be interconnected with each other through the first interconnect interface. The fifth socket and the seventh socket are configured to be interconnected with each other through the first interconnect interface. The sixth socket and the eighth socket are configured to be interconnected with each other through the first interconnect interface. The seventh socket and the eighth socket are configured to be interconnected with each other through the first interconnect interface. The first socket and the fifth socket are configured to be interconnected with each other through the first interconnect interface. The second socket and the sixth socket are configured to be interconnected with each other through the first interconnect interface. The third socket and the seventh socket are configured to be interconnected with each other through the first interconnect interface. The fourth socket and the eighth socket are configured to be interconnected with each other through the first interconnect interface. The fifth socket, the sixth socket, the seventh socket, and the eighth socket are all on a second plane, and the second plane is parallel with the first plane.

An embodiment of the present disclosure provides a interconnect system, including a plurality of modules and a first interconnect interface. Any two of the modules are accessible to each other's hardware resources by transmitting a first packet and a second packet through the first interconnect interface. The modules are dies or chiplets. The first packet includes first interconnect information, used for establishing communication between any two of the modules. The second packet includes a first data payload, loaded from one of the modules. The modules include a first module and a second module, configured to be interconnected with each other through the first interconnect interface.

In some embodiments, the hardware resources include a last-level cache (LLC). The first packet and the second packet are used for maintaining cache coherency between the LLCs of any two modules.

In some embodiments, modules further include a third module. The first module and the third module are configured to be interconnected with each other through the first interconnect interface. The second module and the third module are configured to be interconnected with each other through the first interconnect interface.

In some embodiments, modules further include a third module and a fourth module. The first module and the third module are configured to be interconnected with each other through the first interconnect interface. The second module and the third module are configured to be interconnected with each other through the first interconnect interface. In some embodiments, the first module and the fourth module are configured to be interconnected with each other through the first interconnect interface. The second module and the third module are configured to be interconnected with each other through the first interconnect interface.

In some embodiments, modules further include a fifth module and a sixth module. The first module and the fifth module are configured to be interconnected with each other through the first interconnect interface. The fourth module and the fifth module are configured to be interconnected with each other through the first interconnect interface. The fifth module and the sixth module are configured to be interconnected with each other through the first interconnect interface. The second module and the sixth module are configured to be interconnected with each other through the first interconnect interface. The third module and the sixth module are configured to be interconnected with each other through the first interconnect interface. The fifth module is on a second plane, and the sixth module is on a third plane. The first plane, the second plane, and the third plane are parallel with one another, and the first plane is between the second plane and the third plane.

In some embodiments, modules further include a fifth module, a sixth module, a seventh module, and an eighth module. The fifth module and the sixth module are configured to be interconnected with each other through the first interconnect interface. The fifth module and the seventh module are configured to be interconnected with each other through the first interconnect interface. The sixth module and the eighth module are configured to be interconnected with each other through the first interconnect interface. The seventh module and the eighth module are configured to be interconnected with each other through the first interconnect interface. The first module and the fifth module are configured to be interconnected with each other through the first interconnect interface. The second module and the sixth module are configured to be interconnected with each other through the first interconnect interface. The third module and the seventh module are configured to be interconnected with each other through the first interconnect interface. The fourth module and the eighth module are configured to be interconnected with each other through the first interconnect interface. The fifth module, the sixth module, the seventh module, and the eighth module are all on a second plane, and the second plane is parallel with the first plane.

The present application discloses a interconnect system that realizes low delay, high bandwidth utilization, and high space utilization through the interconnect interface and topology design.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

The present disclosure provides a chip-cross interconnect system, including a plurality of sockets, and a first interconnect interface between the sockets. The sockets communicate with each other through the first interconnect interface. The first interconnect interface is hereinafter referred to as the "the ZPI".

Figure 1:
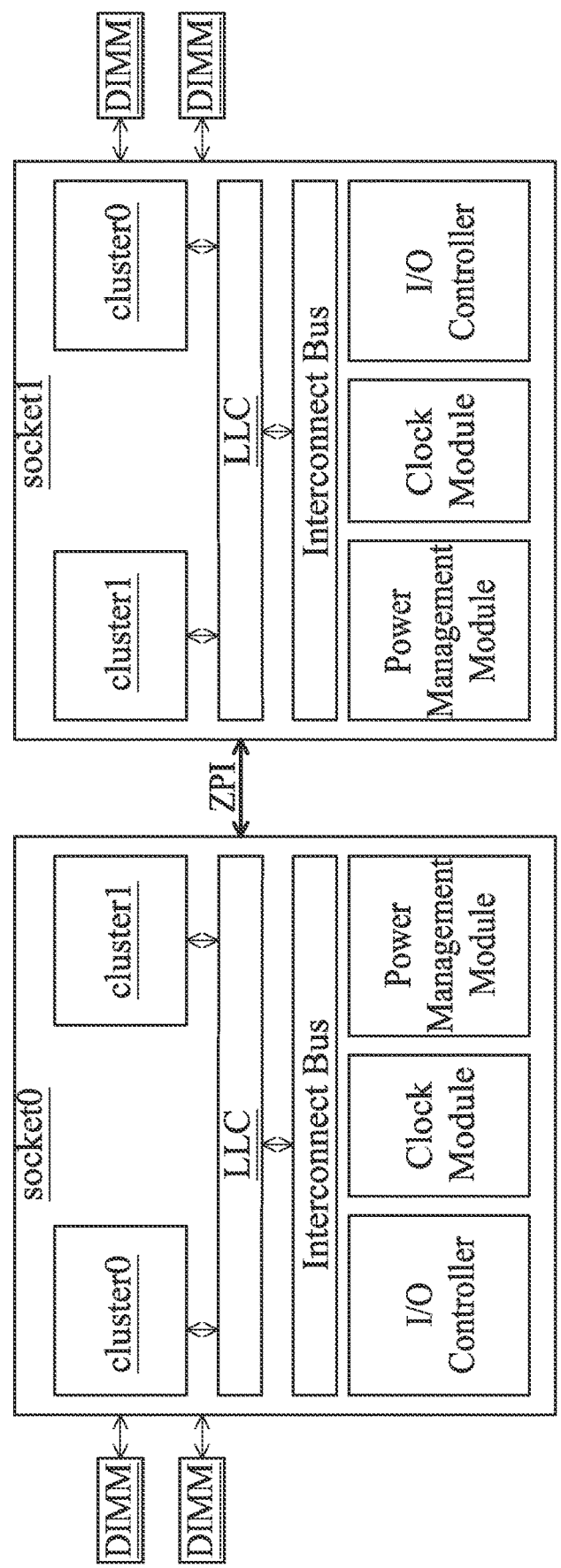
FIG. 1 is a structural diagram of an exemplary system, according to an embodiment of the present disclosure.

FIG. 1 is a structural diagram of an exemplary system 10, according to an embodiment of the present disclosure. As shown in FIG. 1, the system 10 is provided with two sockets: socket0 and socket1, and the ZPI between the two sockets. Socket0 and socket1 are interconnected with each other through the ZPI. In the example of FIG. 1, each socket is provided with two clusters, labeled as cluster0 and cluster1 respectively. In other cases, there may be one or more clusters in each socket. Each cluster includes several central processing unit (CPU) cores (not shown in FIG. 1). Each socket may be provided with a last level cache (LLC), an interconnect bus, and other various components (such as an input/output controller, a clock module, a power management module, etc.). Each socket may be connected to dual in-line memory modules (DIMM).

In the system 10, socket0 and socket1 may communicate with each other by transmitting packets with a specific format through the ZPI. Thus, the CPU cores in socket0 are accessible to the hardware resources (such as LLC, DIMM, or other storage media) of socket1. Similarly, the CPU cores in socket1 may also access the hardware resources of socket0. As such, the CPU cores of all clusters, and the input/output resources in the system 10 can be dispatched together, and the hardware resources owned by socket0 and socket1 can be shared. For example, any CPU core or input/output device can access the memory resources owned by socket0 and socket1. In another example, socket0 and socket1 can maintain the cache coherency between each other by transmitting a packet that maintains cache coherency through the ZPI.

Figure 2:
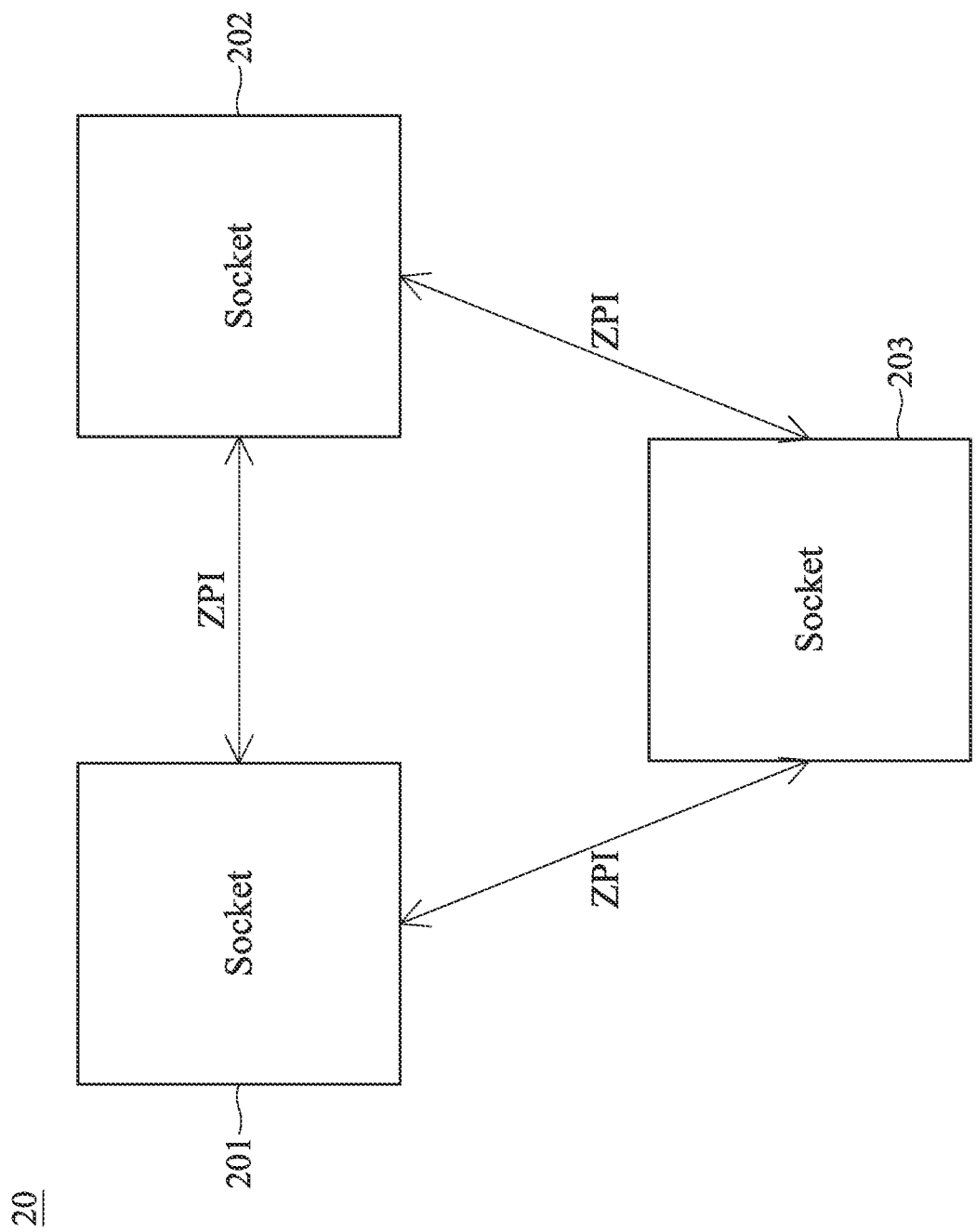
FIG. 2 illustrates the topological diagram of an exemplary system, according to an embodiment of the present disclosure.

FIG. 2 illustrates the topological diagram of an exemplary system 20, according to an embodiment of the present disclosure. As shown in FIG. 2, the system 20 is provided with a socket 201, a socket 202, and a socket 203. The socket 201 and the socket 202 are interconnected with each other through the ZPI. The socket 202 and the socket 203 are interconnected with each other through the ZPI. The socket 201 and the socket 203 are interconnected with each other through the ZPI. Thus, a ring topology with three sockets is formed.

As previously discussed over the system 10 in FIG. 1, any two of the socket 201, the socket 202, and the socket 203 shown in FIG. 2 are accessible to each other's hardware resources by transmitting packets through the ZPI.

Figure 3A:
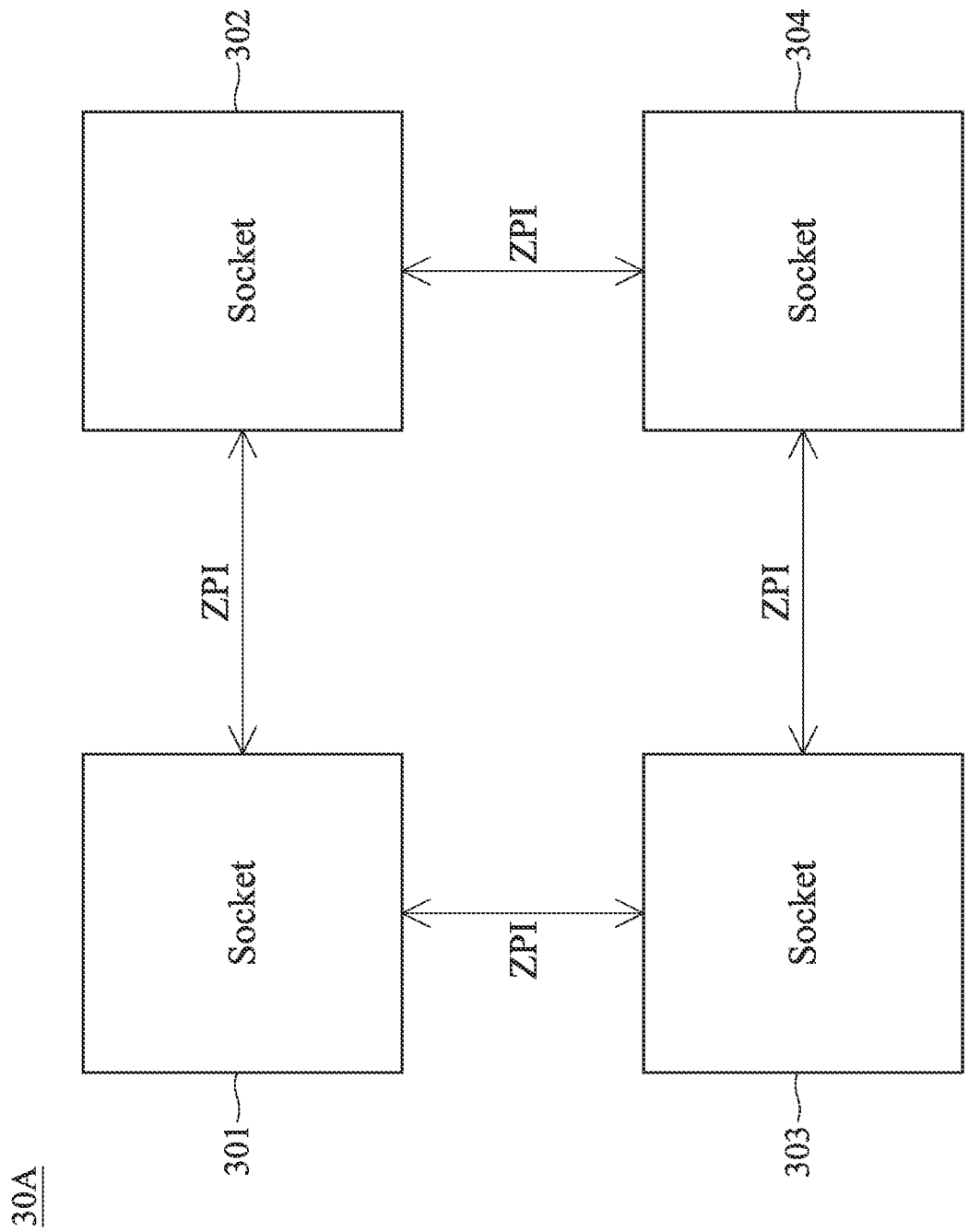
FIG. 3A illustrates the topological diagram of an exemplary system, according to an embodiment of the present disclosure.

FIG. 3A illustrates the topological diagram of an exemplary system 30A, according to an embodiment of the present disclosure. As shown in FIG. 3A, the system 30A is provided with a socket 301, a socket 302, a socket 303, and a socket 304. All the four sockets are on the same plane. The socket 301 and the socket 302 are interconnected with each other through the ZPI. The socket 302 and the socket 304 are interconnected with each other through the ZPI. The socket 304 and the socket 303 are interconnected with each other through the ZPI. The socket 303 and the socket 301 are interconnected with each other through the ZPI. Thus, a ring topology with four sockets is formed.

As previously discussed over the system 10 in FIG. 1 or the system 20 in FIG. 2, any two of the socket 301, the socket 302, the socket 303, and the socket 304 shown in FIG. 3 are accessible to the hardware resources of one another by transmitting packets through the ZPI. It should be noted that although the socket 301 and the socket 304 are not directly interconnected with each other through the ZPI, they can still communicate with each other by transmitting packets through the ZPI via an intermediate node (the socket 302 or the socket 303). Similarly, although the socket 302 and the socket 303 are not directly interconnected with each other through the ZPI, they can still communicate with each other by transmitting packets through the ZPI via an intermediate node (the socket 301 or the socket 304).

Figure 3B:
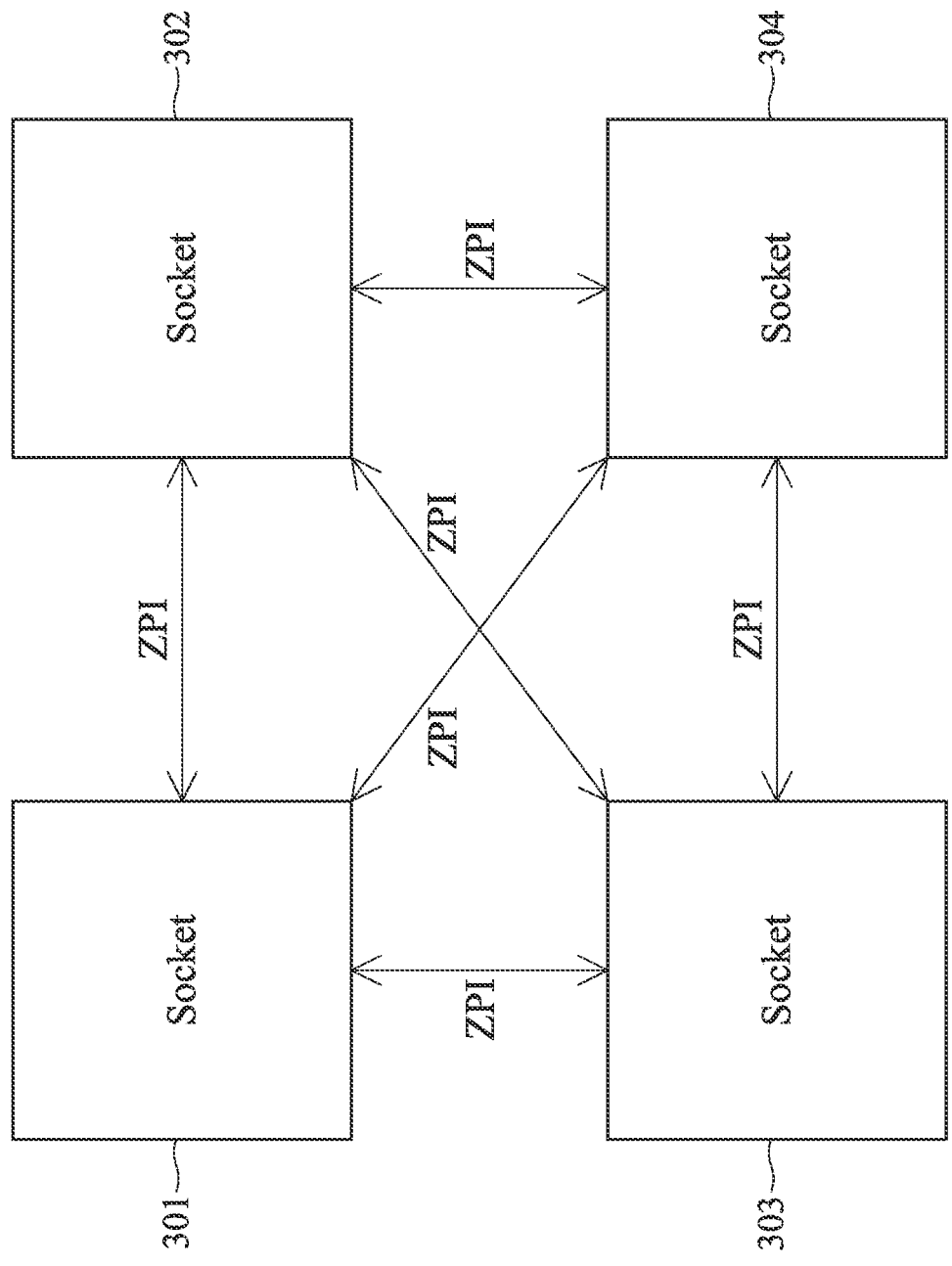
FIG. 3B illustrates the topological diagram of an exemplary system, according to an embodiment of the present disclosure.

FIG. 3B illustrates the topological diagram of an exemplary system 30B, according to an embodiment of the present disclosure. Compared to the system 30A in FIG. 3A, the socket 302 and the socket 303 are directly interconnected with each other through the ZPI, and the socket 301 and the socket 304 are directly interconnected with each other through the ZPI in the system 30B. As such, the communication between the socket 302 and the socket 303, as well as the communication between the socket 301 and the socket 304, do not need to go through any intermediate nodes.

Figure 4:
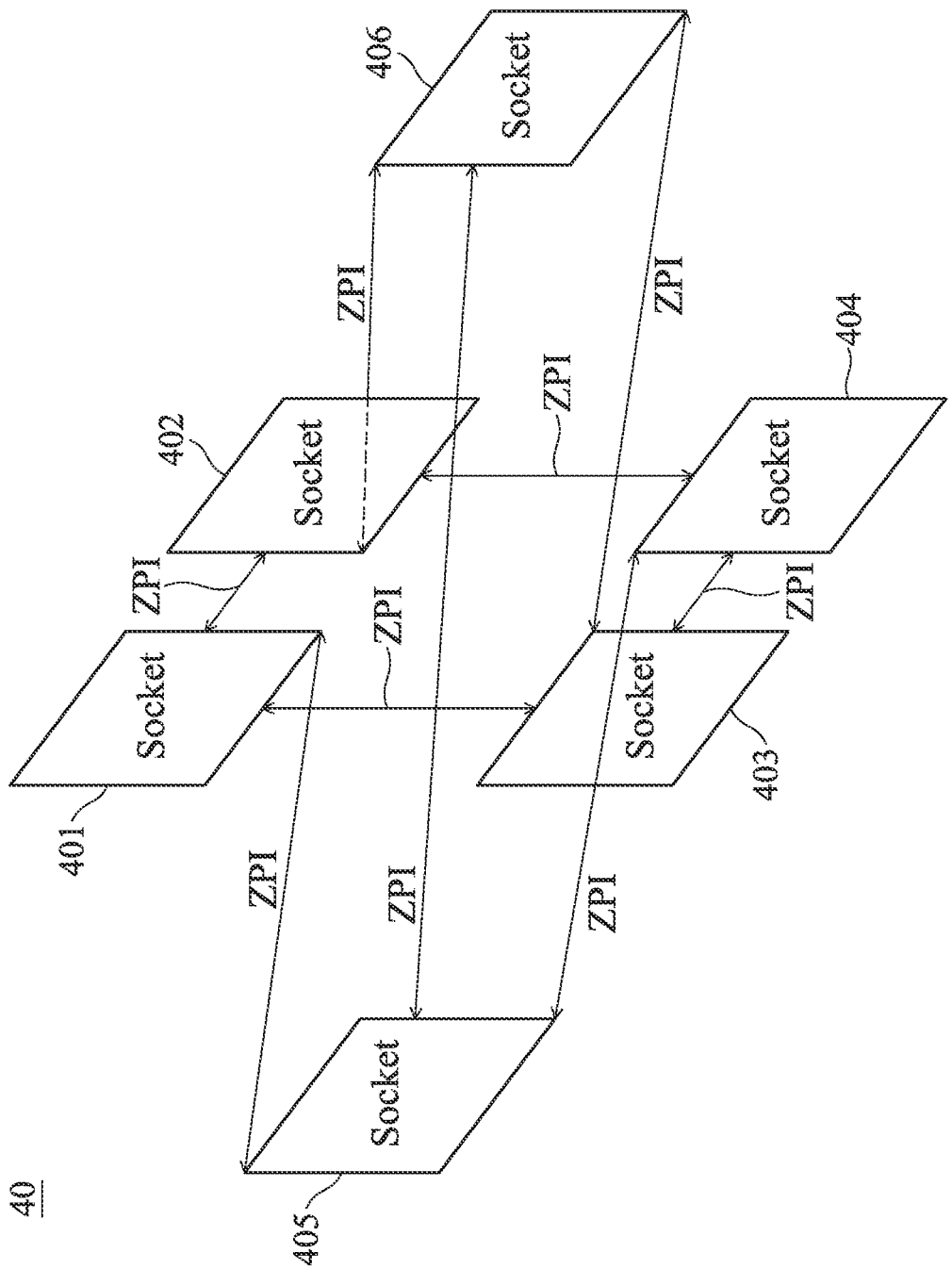
FIG. 4 illustrates the topological diagram of an exemplary system, according to an embodiment of the present disclosure.

FIG. 4 illustrates the topological diagram of an exemplary system 40, according to an embodiment of the present disclosure. As shown in FIG. 4, the system 40 is provided with a socket 401, a socket 402, a socket 403, a socket 404, a socket 405, and a socket 406. The socket 401, the socket 402, the socket 403, and the socket 404 are on the same plane, hereinafter referred to as "the first plane". The socket 405 is on the second plane, and the socket 406 is on the third plane. The first plane, the second plane, and the third plane are parallel with one another, and the first plane is between the second plane and the third plane. The socket 401 and the socket 402 are interconnected with each other through the ZPI. The socket 402 and the socket 404 are interconnected with each other through the ZPI. The socket 404 and the socket 403 are interconnected with each other through the ZPI. The socket 403 and the socket 401 are interconnected with each other through the ZPI. Thus, a ring topology with four sockets on the first plane is formed. The socket 405 is interconnected with the socket 401, the socket 404, and the socket 406 respectively through the ZPI. The socket 406 is interconnected with the socket 402, the socket 403, and the socket 405 respectively through the ZPI. As such, a three-layer three-dimensional topology with six sockets is formed, as shown in FIG. 4. In other cases, the system 40 in FIG. 4 as a basis may be expanded to an interconnect topology with more layers (planes), and the number of sockets in each layer (plane) may be expanded to a larger amount.

As previously discussed over the system 10 in FIG. 1, the system 20 in FIG. 2, or the system 30A in FIG. 3A, any two of the socket 401, the socket 402, the socket 403, the socket 404, the socket 405, and the socket 406 shown in FIG. 4 are accessible to the hardware resources of one another by transmitting packets through the ZPI. Although the socket 401 and the socket 404 are not directly interconnected with each other through the ZPI, they can still communicate with each other by transmitting packets through the ZPI via an intermediate node (the socket 402 or the socket 403). Similarly, although the socket 402 and the socket 403 are not directly interconnected with each other through the ZPI, they can still communicate with each other by transmitting packets through the ZPI via an intermediate node (the socket 401 or the socket 404). Although the socket 405 and the socket 402 are not directly interconnected with each other through the ZPI, they can still communicate with each other by transmitting packets through the ZPI via an intermediate node (the socket 401 or the socket 404). Although the socket 405 and the socket 403 are not directly interconnected with each other through the ZPI, they can still communicate with each other by transmitting packets through the ZPI via an intermediate node (the socket 401 or the socket 404). Although the socket 406 and the socket 401 are not directly interconnected with each other through the ZPI, they can still communicate with each other by transmitting packets through the ZPI via an intermediate node (the socket 402 or the socket 403). Although the socket 406 and the socket 404 are not directly interconnected with each other through the ZPI, they can still communicate with each other by transmitting packets through the ZPI via an intermediate node (the socket 402 or the socket 403).

Figure 5:
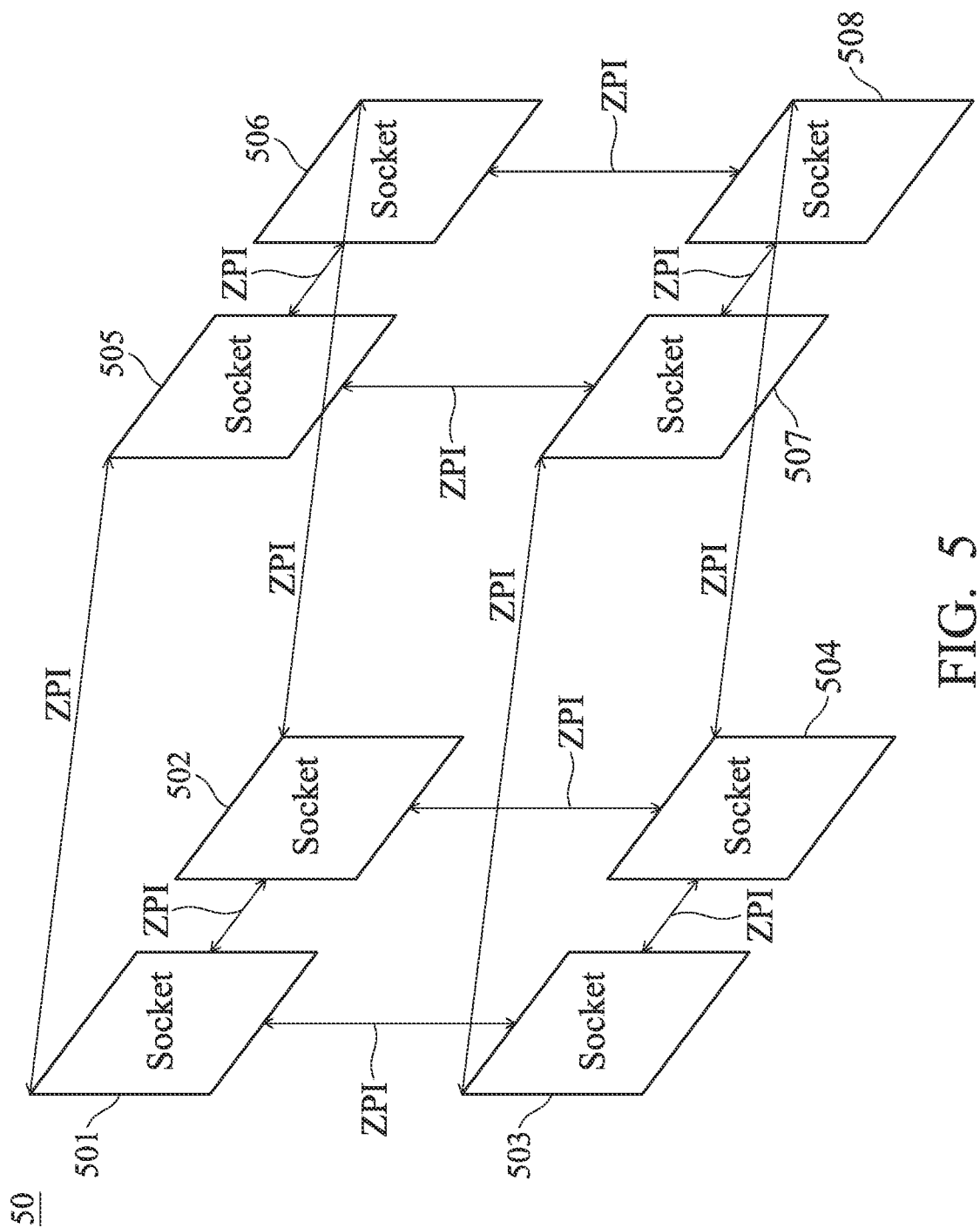
FIG. 5 illustrates the topological diagram of an exemplary system, according to an embodiment of the present disclosure.

FIG. 5 illustrates the topological diagram of an exemplary system 50, according to an embodiment of the present disclosure. As shown in FIG. 5, the system 50 is provided with a socket 501, a socket 502, a socket 503, a socket 504, a socket 505, a socket 506, a socket 507, and a socket 508. The socket 501, the socket 502, the socket 503, and the socket 504 are on the same plane, hereinafter referred to as "the plane A". The socket 505, the socket 506, the socket 507, and the socket 508 are on another same plane, hereinafter referred to as "the plane B". The plane A and the plane B are parallel with each other. The socket 501 and the socket 502 are interconnected with each other through the ZPI. The socket 502 and the socket 504 are interconnected with each other through the ZPI. The socket 504 and the socket 503 are interconnected with each other through the ZPI. The socket 503 and the socket 501 are interconnected with each other through the ZPI. Thus, a ring topology with four sockets on the plane A is formed. The socket 505 and the socket 506 are interconnected with each other through the ZPI. The socket 506 and the socket 508 are interconnected with each other through the ZPI. The socket 508 and the socket 507 are interconnected with each other through the ZPI. The socket 507 and the socket 505 are interconnected with each other through the ZPI. Thus, a ring topology with four sockets on the plane B is formed. The socket 501 the socket 502, the socket 503, and the socket 504 on the plane A are respectively interconnected with the socket 505, the socket 506, the socket 507, and the socket 508 on the plane B. As such, a two-layer three-dimensional topology with eight sockets is formed, as shown in FIG. 5. In other cases, the system 50 in FIG. 5 as a basis may be expanded to an interconnect topology with more layers (planes), and the number of sockets in each layer (plane) may be expanded to a larger amount.

As previously discussed over the system 10 in FIG. 1, the system 20 in FIG. 2, the system 30A in FIG. 3A, or the system 30B in FIG. 3B, any two of the socket 501, the socket 502, the socket 503, the socket 504, the socket 505, the socket 506, the socket 507, and the socket 508 shown in FIG. 5 are accessible to the hardware resources of one another by transmitting packets through the ZPI. Although the socket 501 and the socket 504 are not directly interconnected with each other through the ZPI, they can still communicate with each other by transmitting packets through the ZPI via an intermediate node (the socket 502 or the socket 503). Similarly, although the socket 502 and the socket 503 are not directly interconnected with each other through the ZPI, they can still communicate with each other by transmitting packets through the ZPI via an intermediate node (the socket 501 or the socket 504). Although the socket 505 and the socket 508 are not directly interconnected with each other through the ZPI, they can still communicate with each other by transmitting packets through the ZPI via an intermediate node (the socket 506 or the socket 507). Although the socket 506 and the socket 507 are not directly interconnected with each other through the ZPI, they can still communicate with each other by transmitting packets through the ZPI via an intermediate node (the socket 505 or the socket 508). Although the socket 505 and the socket 508 are not directly interconnected with each other through the ZPI, they can still communicate with each other by transmitting packets through the ZPI via an intermediate node (the socket 506 or the socket 507).

Furthermore, for any two sockets that are not on the same plane and not directly interconnected with each other through the ZPI, the routing path for packet transmission may follow these rules: cross the plane(s) first, and then take the shortest path on the plane; and when there are multiple shortest paths on the same plane, determine the next transmission node clockwise. For example, the routing path for transmitting packets through the ZPI from the socket 501 to the socket 508 may be "the socket 501→the socket 505→the socket 506→the socket 508", in which "the socket 501→the socket 505" follows the rule of "cross the plane(s) first", and "the socket 505→the socket 506→the socket 508" follows the rule of "determine the next transmission node clockwise". In another example, the routing path for transmitting packets through the ZPI from the socket 506 to the socket 503 may be "the socket 506→the socket 502→the socket 504→the socket 503", in which "the socket 506→the socket 502" follows the rule of "cross the plane(s) first", and "the socket 502→the socket 504→the socket 503" follows the rule of "determine the next transmission node clockwise". However, the routing path for packet transmission may follow other rules, the present disclosure is not limited hereto. For example, when there are multiple shortest paths on the same plane, the next transmission node may be determined counterclockwise.

According to other embodiments of the present disclosure, the topology of the interconnect system in FIG. 2 to FIG. 5 may also be applied on the interconnection between dies or between chiplets. In other words, the sockets in FIG. 2 to FIG. 5 may be replaced with dies or chiplets. A chiplet is a heterogeneous integration system. In other words, different components can be fully designed on a single chip. In an embodiment of the present disclosure, the production art of the chiplet may be different.

According to an embodiment of the present disclosure, each socket in the chip-cross interconnect system may include multiple dies and a second interconnect interface. The dies communicates with one another through the second interconnect interface, hereinafter referred to as "the ZDI".

Figure 6:
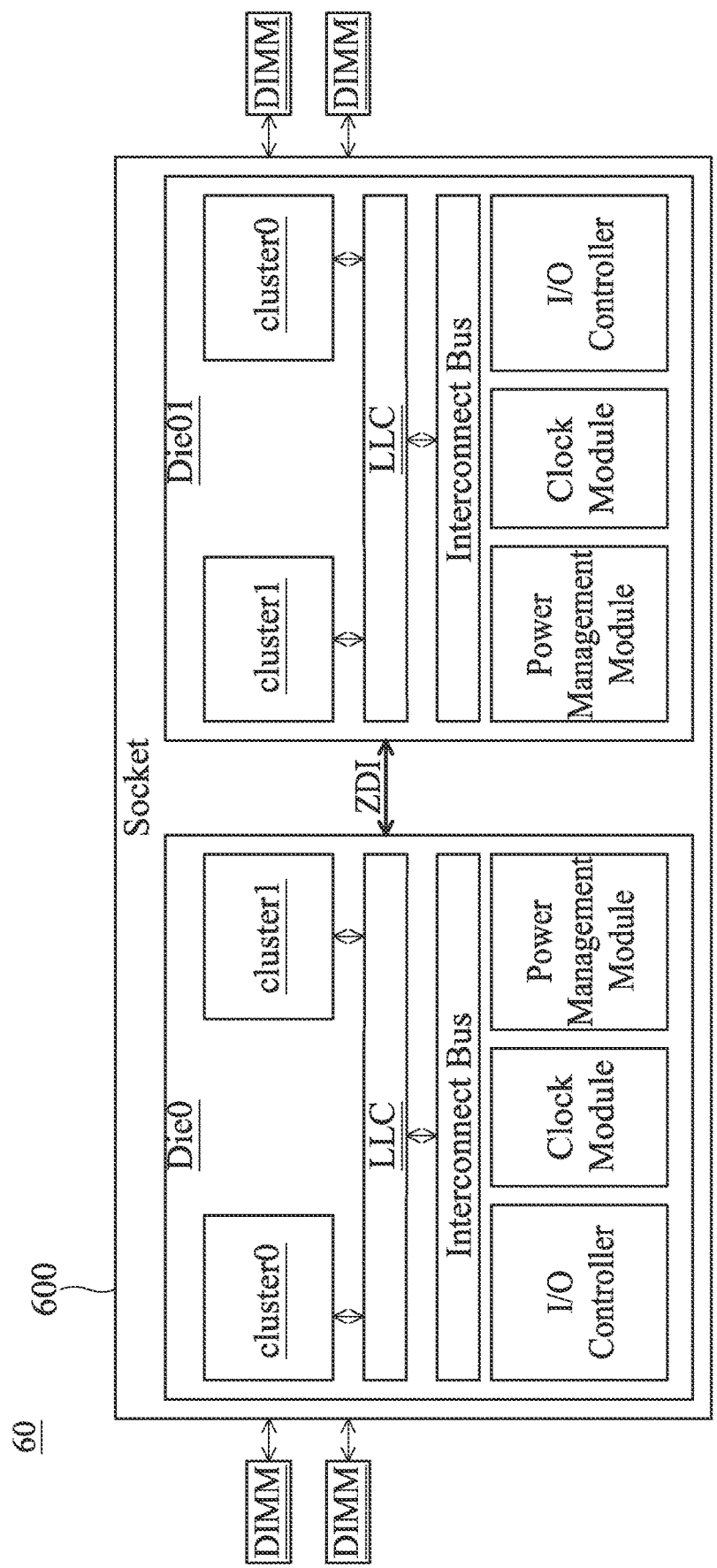
FIG. 6 is a structural diagram of an exemplary system, according to an embodiment of the present disclosure.

FIG. 6 is a structural diagram of an exemplary system 60, according to an embodiment of the present disclosure. As shown in FIG. 6, the socket 600 in the system 60 is provided with two dies: Die0 and Die1, and the ZDI between the two dies. Die0 and Die1 are interconnected with each other through the ZDI. In other cases, there may be more dies in each socket. In the example of FIG. 6, each socket is provided with two clusters, labeled as cluster0 and cluster1 respectively. In other cases, there may be one or more clusters in each die. Each die may be provided with a last level cache (LLC), an interconnect bus, and other various components (such as an input/output controller, a clock module, a power management module, etc.).

In the system 60, Die0 and Die1 may communicate with each other by transmitting packets with a specific format through the ZDI. Thus, the CPU cores in Die0 are accessible to the hardware resources of Die1. Similarly, the CPU cores in Die1 may also access the hardware resources of Die0.

The ZPI and the ZDI described above may be used together, so that the dies in different sockets may communicate with each other.

Figure 7A:
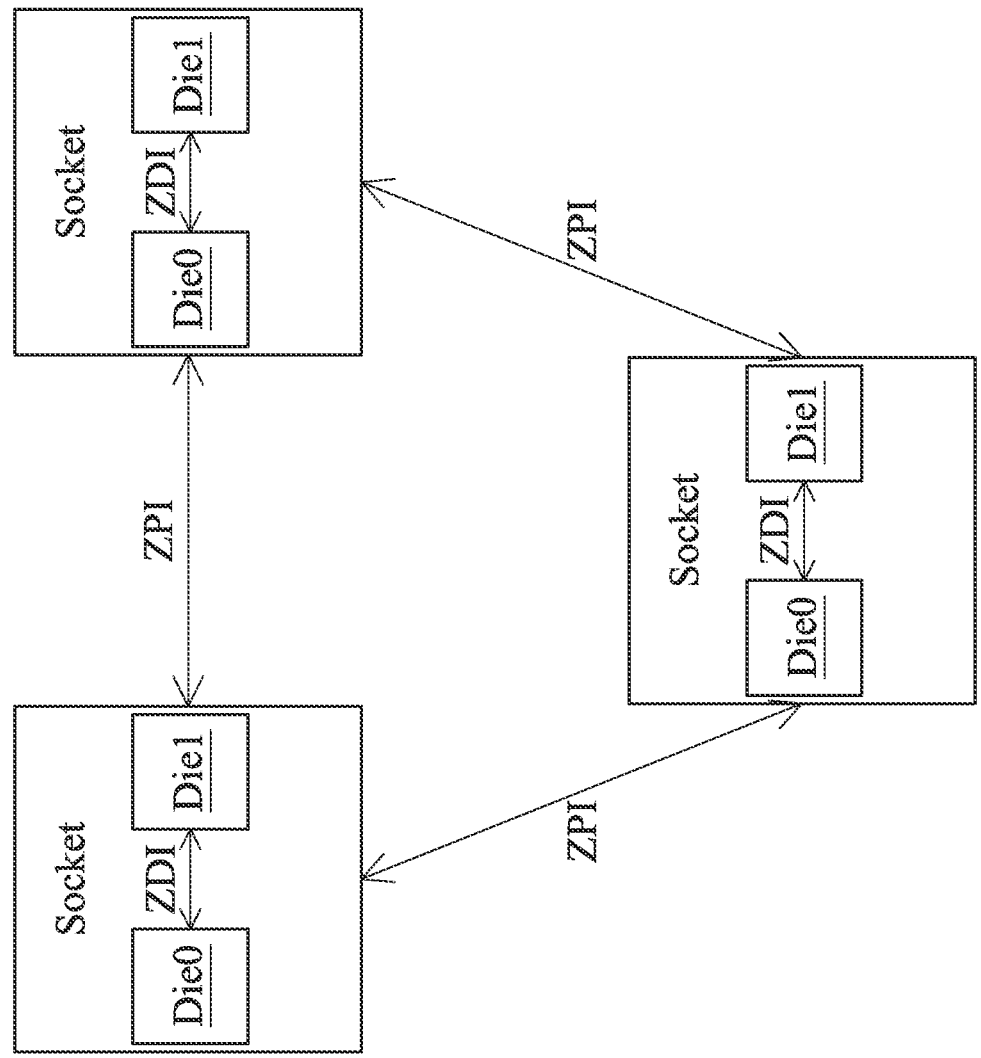
FIG. 7A is a structural diagram of an exemplary system, according to an embodiment of the present disclosure.

FIG. 7A is a structural diagram of an exemplary system 70A, according to an embodiment of the present disclosure. The system 70A is on the basis of the system 20 in FIG. 2, in addition that each socket is further provided with Die0 and Die1 that are interconnected to each other through the ZDI. As such, the hardware resources of the six dies in FIG. 7A can be shared. In other examples, there may be more dies in each socket.

Figure 7B:
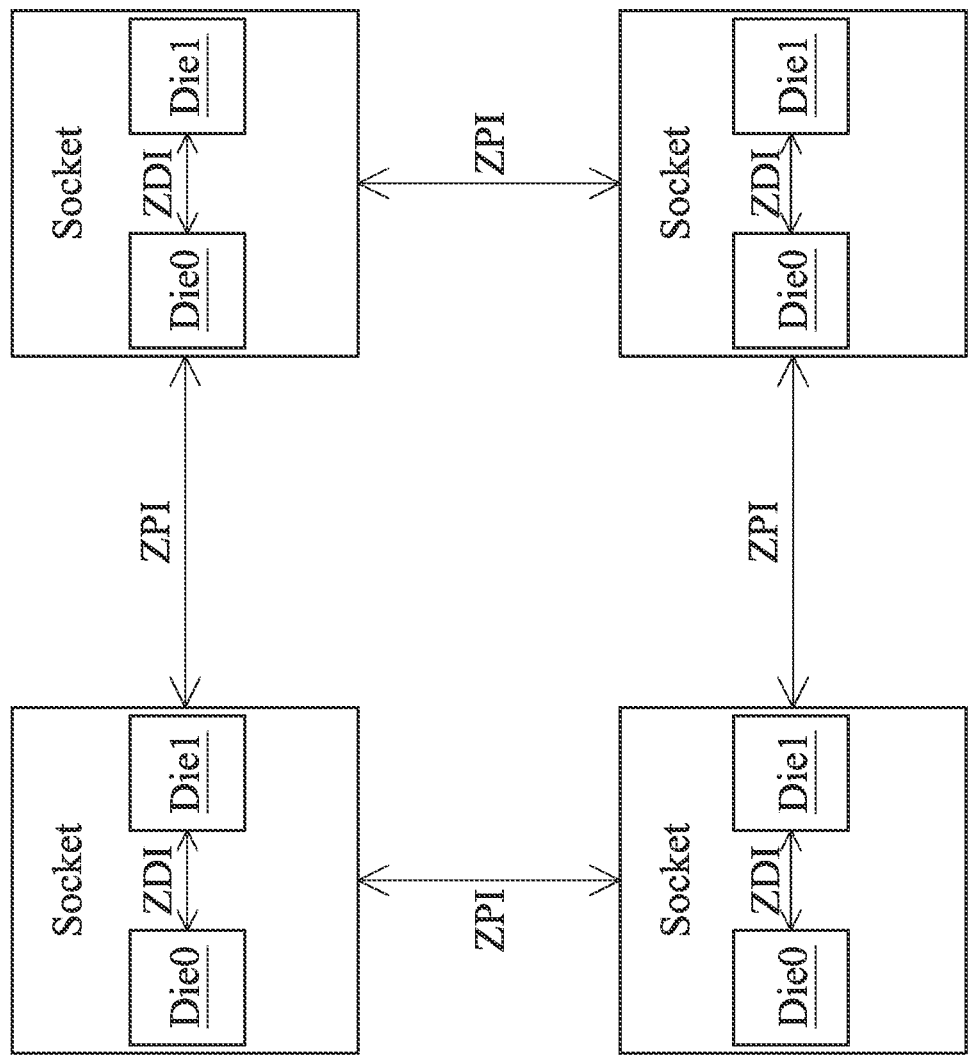
FIG. 7B is a structural diagram of an exemplary system, according to an embodiment of the present disclosure.

FIG. 7B is a structural diagram of an exemplary system 70B, according to an embodiment of the present disclosure. The system 70B is on the basis of the system 30A in FIG. 3A, in addition that each socket is further provided with Die0 and Die1 that are interconnected to each other through the ZDI. As such, the hardware resources of the eight dies in FIG. 7B can be shared. In other examples, there may be more dies in each socket.

Figure 7C:
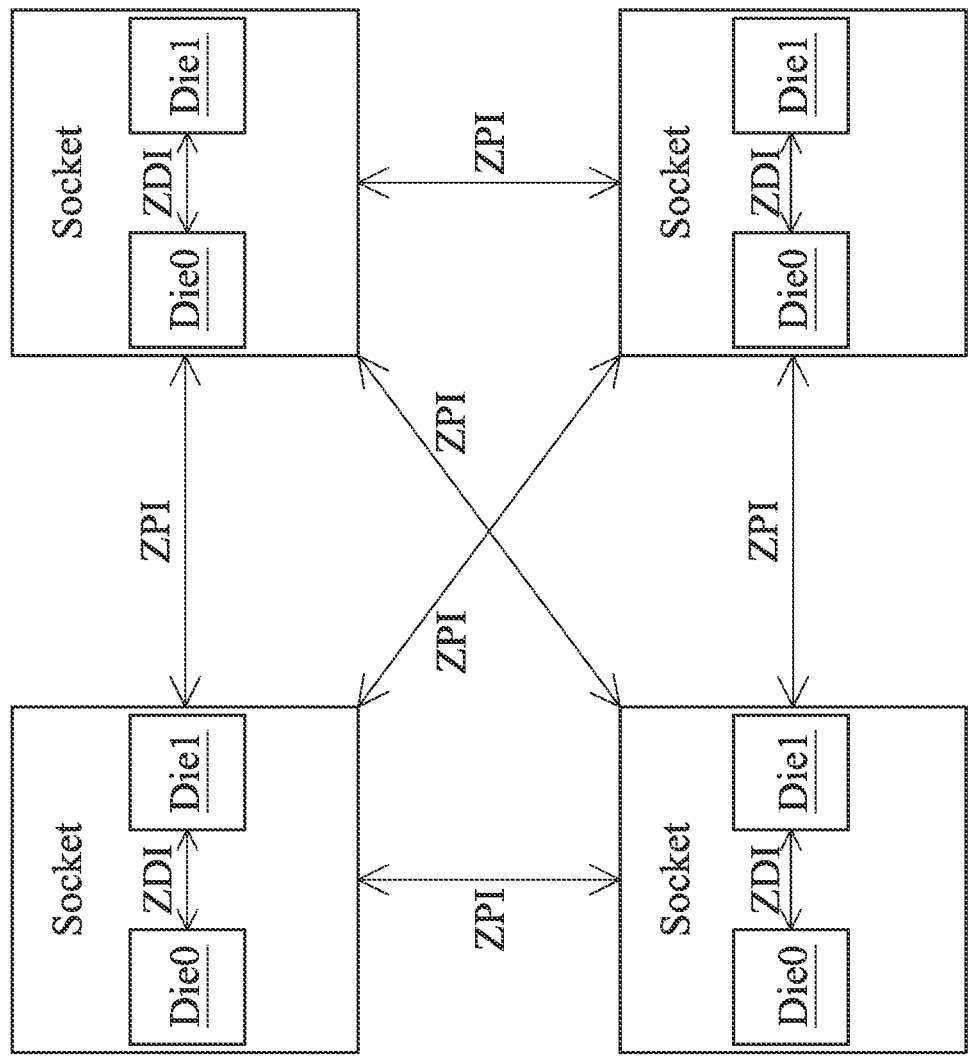
FIG. 7C is a structural diagram of an exemplary system, according to an embodiment of the present disclosure.

FIG. 7C is a structural diagram of an exemplary system 70C, according to an embodiment of the present disclosure. The system 70C is on the basis of the system 30B in FIG. 3B, in addition that each socket is further provided with Die0 and Die1 that are interconnected to each other through the ZDI. As such, the hardware resources of the eight dies in FIG. 7C can be shared. Compared to the system 70B in FIG. 7, the system 70C has more ZPIs that directly connects two sockets, such that the communication paths between the dies in different sockets may be shorter.

Figure 7D:
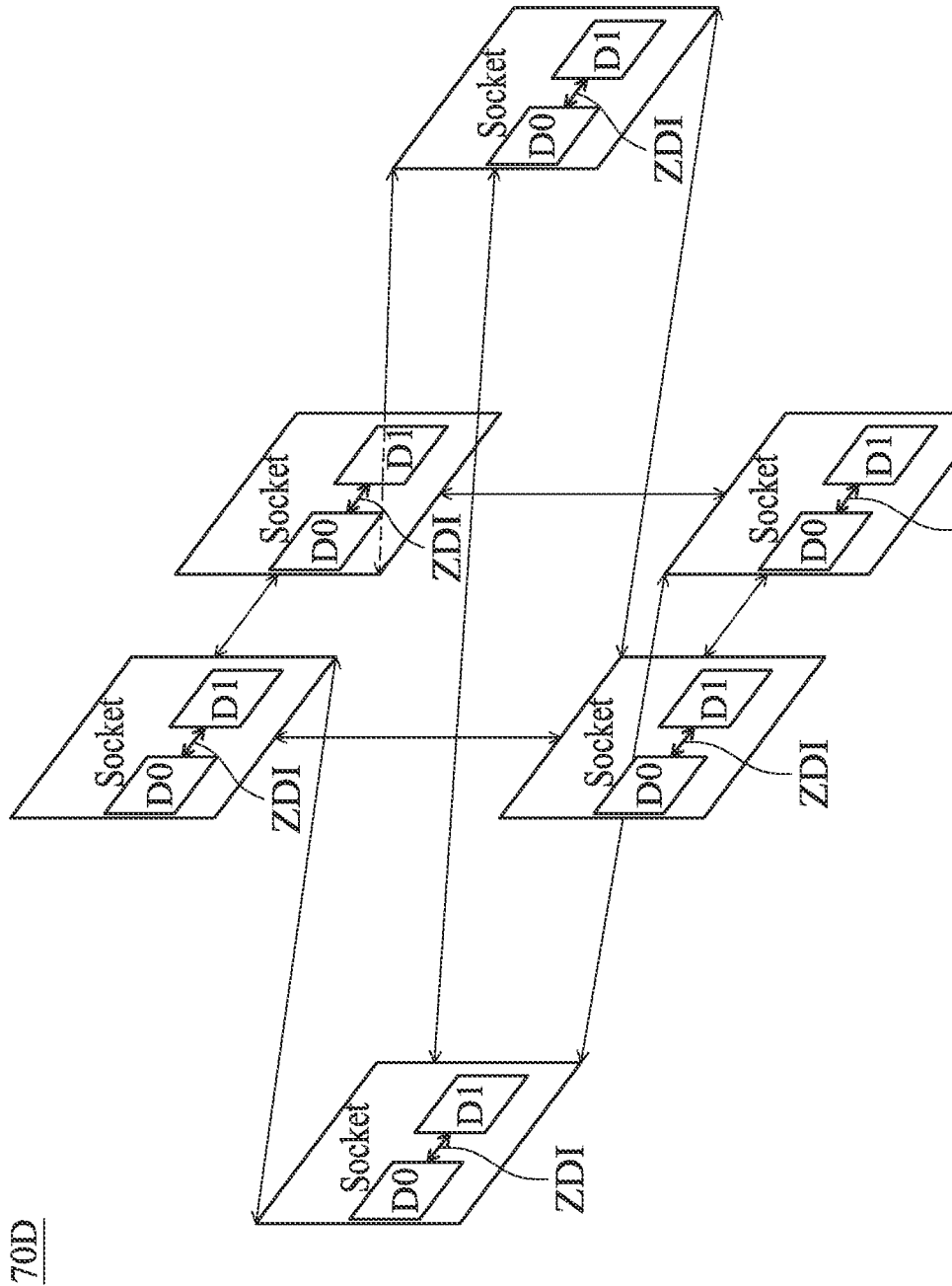
FIG. 7D is a structural diagram of an exemplary system, according to an embodiment of the present disclosure.

FIG. 7D is a structural diagram of an exemplary system 70D, according to an embodiment of the present disclosure. The system 70D is on the basis of the system 40 in FIG. 4, in addition that each socket is further provided with dies D0 and D1 that are interconnected to each other through the ZDI. As such, the hardware resources of the twelve dies in FIG. 7D can be shared. In other examples, the system 70D in FIG. 7D as a basis may be expanded to an interconnect topology with more layers (planes), and the number of sockets in each layer (plane) may be expanded to a larger amount. There may be more dies in each socket.

Figure 7E:
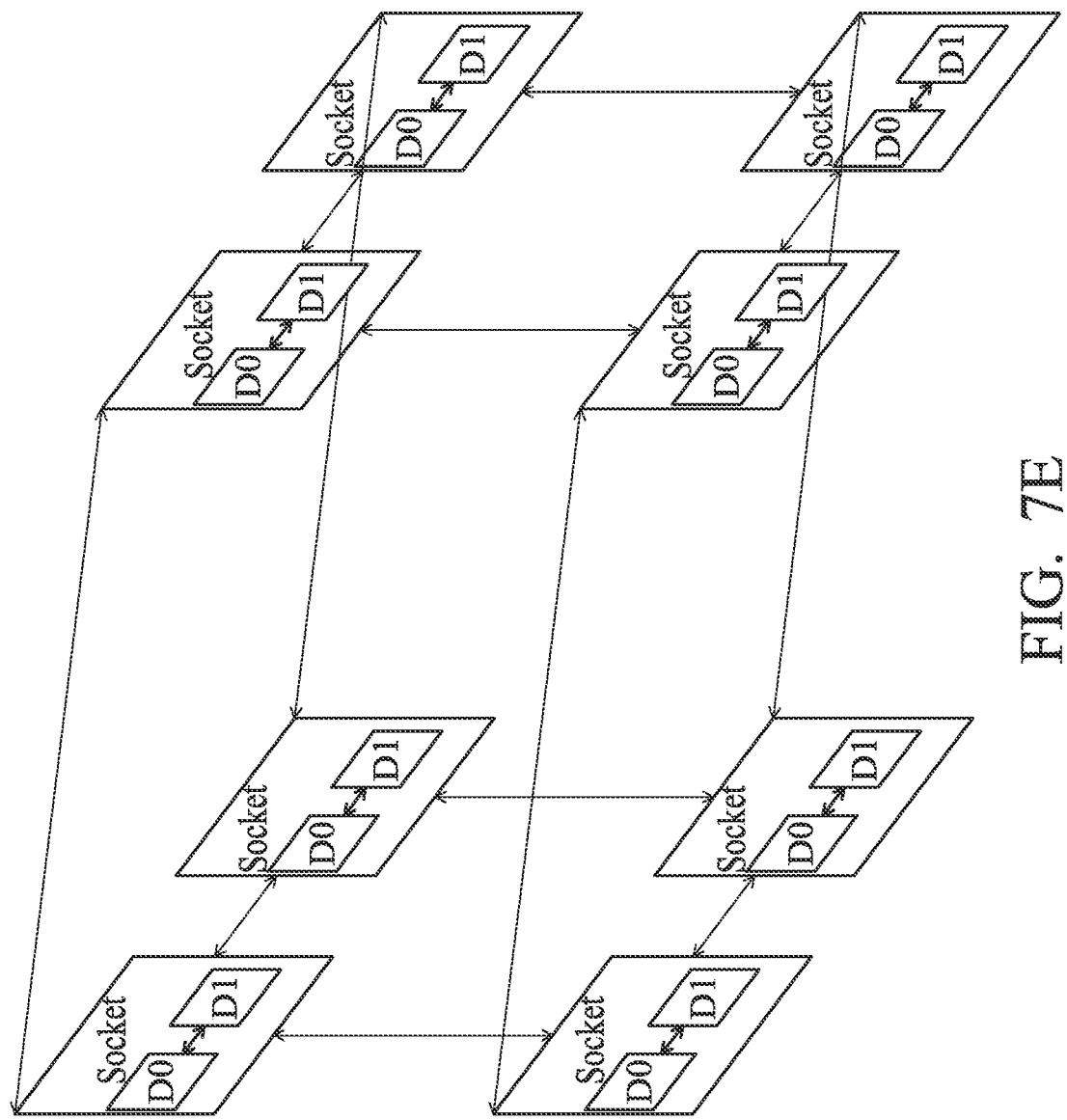
FIG. 7E is a structural diagram of an exemplary system, according to an embodiment of the present disclosure.

FIG. 7E is a structural diagram of an exemplary system 70E, according to an embodiment of the present disclosure. The system 70E is on the basis of the system 50 in FIG. 5, in addition that each socket is further provided with dies D0 and D1 that are interconnected to each other through the ZDI. As such, the hardware resources of the sixteen dies in FIG. 7E can be shared. In other examples, the system 70E in FIG. 7E as a basis may be expanded to an interconnect topology with more layers (planes), and the number of sockets in each layer (plane) may be expanded to a larger amount. There may be more dies in each socket.

Figure 8:
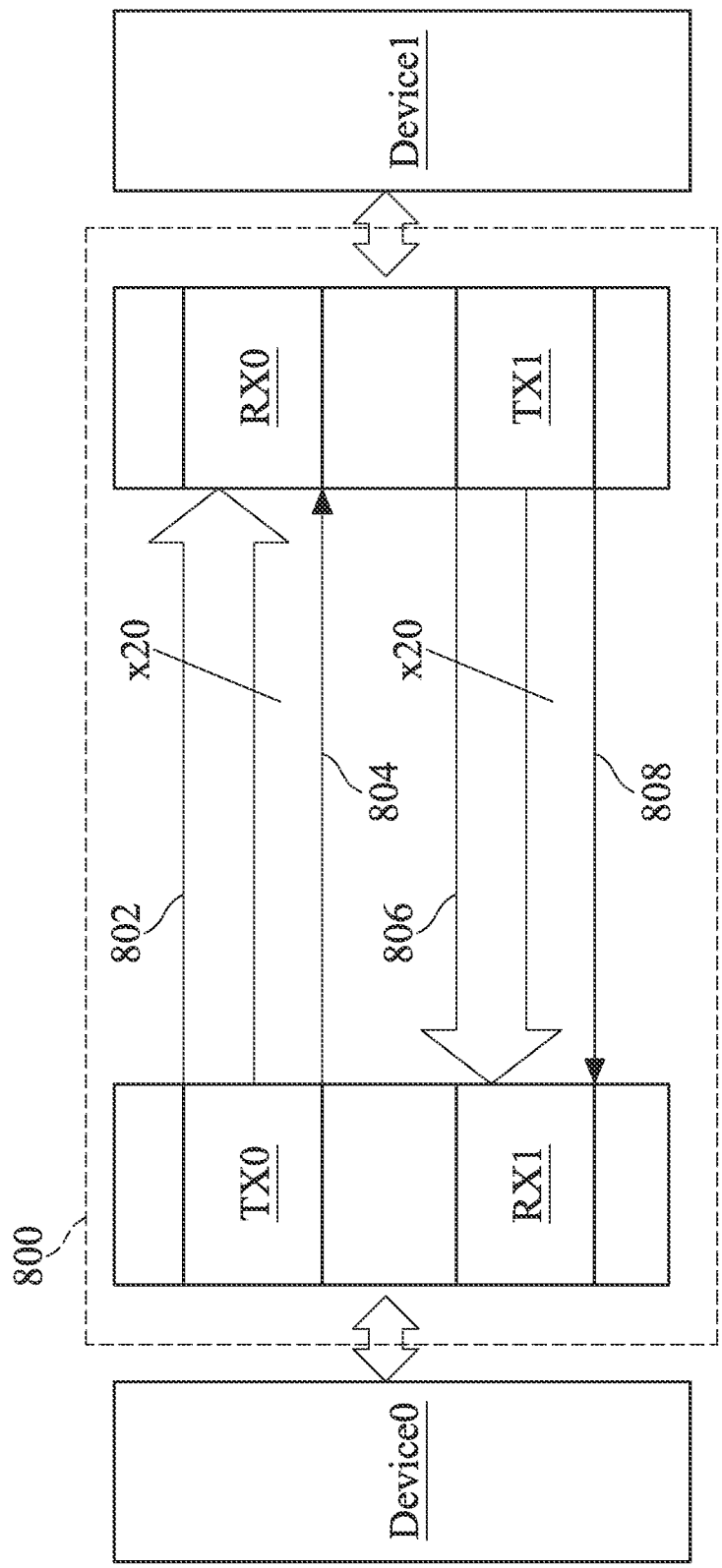
FIG. 8 illustrates the communication architecture of ZPI/ZDI, according to an embodiment of the present disclosure.

FIG. 8 illustrates the communication architecture of ZPI/ZDI, according to an embodiment of the present disclosure. As shown in FIG. 8, the interconnect interface 800 provides a two-way transmission channel between devices Device0 and Device1. The interconnect interface 800 is a full-duplex design and allows simultaneous transmission in the opposite directions. In an embodiment, Device0 and Device1 are two sockets, and the interconnect interface 800 is the ZPI. In another embodiment, Device0 and Device1 are two dies, and the interconnect interface 800 is the ZDI.

From Device0 to Device1, a packet signal 802 and a clock signal 804 are transmitted by the transmitter TX0 of the interconnect interface 800 and received by the receiver RX0 of the interconnect interface 800. For the data transmission in the opposite direction, the interconnect interface 800 further provides a transmitter TX1 at Device1, and a receiver RX1 at Device0. From Device1 to Device0, a packet signal 806 and a clock signal 808 are transmitted by the transmitter TX1 of the interconnect interface 800 and received by the receiver RX1 of the interconnect interface 800.

Figure 9A:
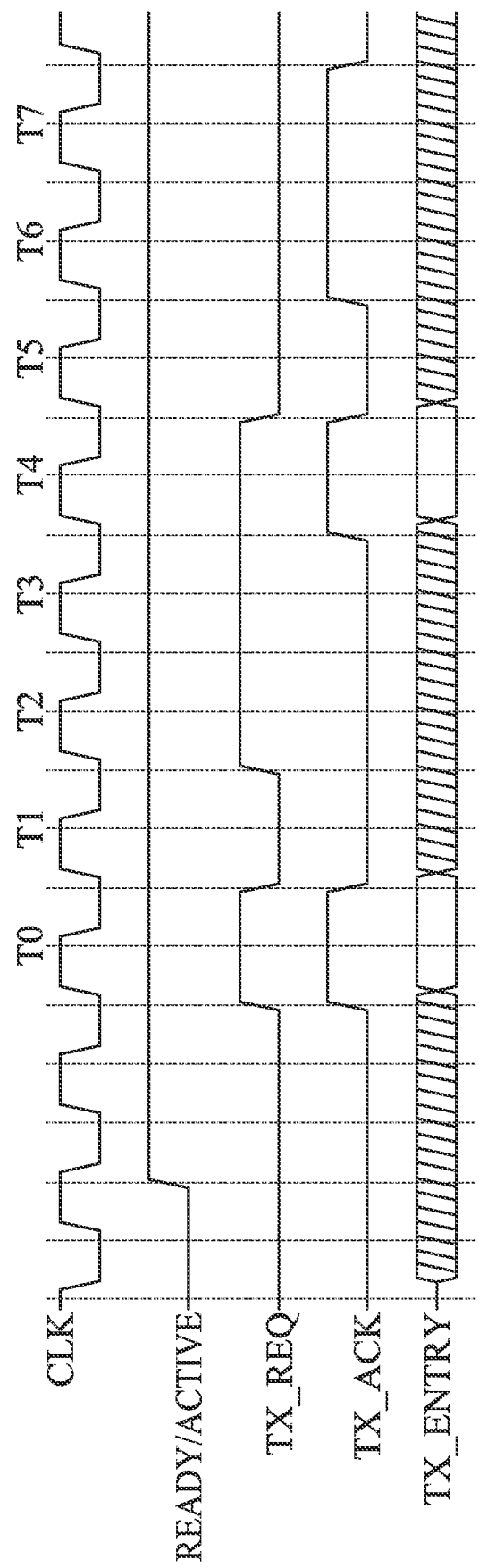
FIG. 9A and FIG. 9B are waveform diagrams for describing the input and output (I/O) protocol of ZPI/ZDI.
Figure 9B:
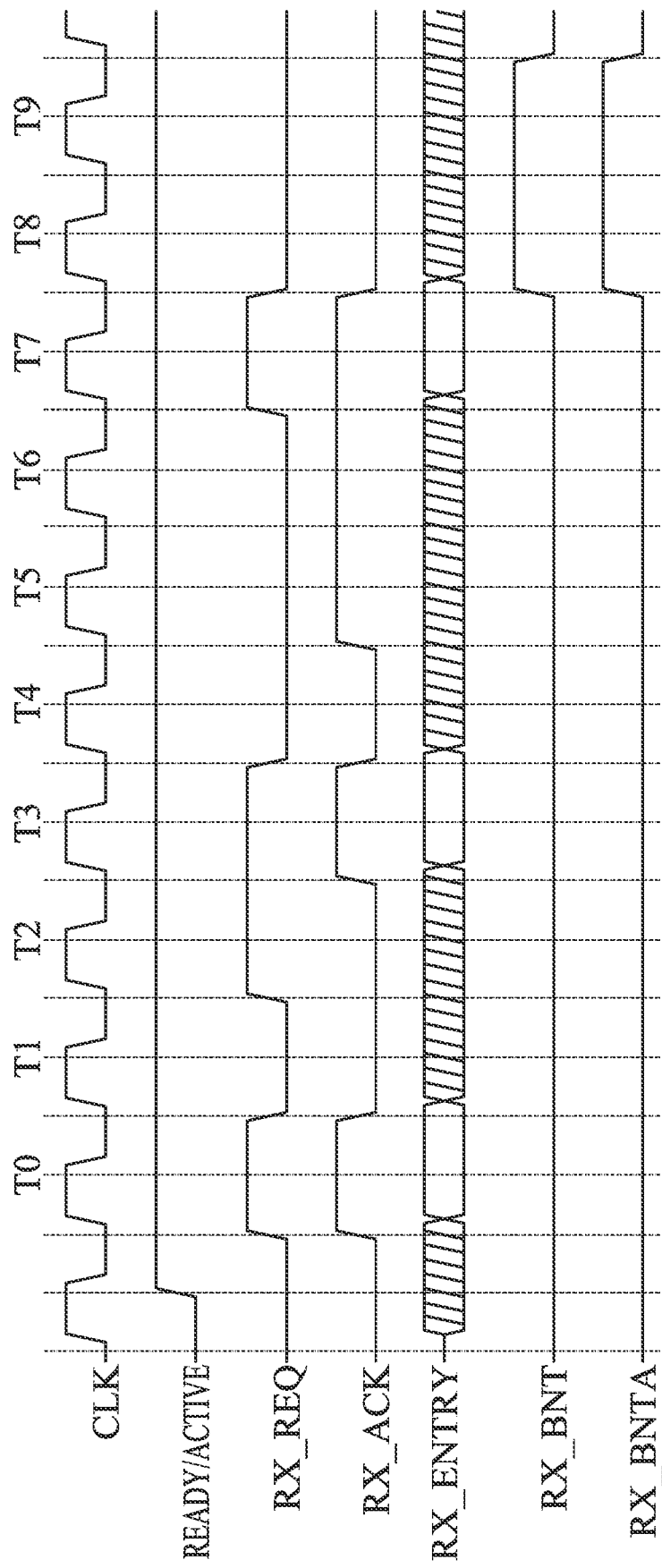

FIG. 9A and FIG. 9B are waveform diagrams for describing the input and output (I/O) protocol of ZPI/ZDI. In FIG. 9A and FIG. 9B, the data signal TX_ENTRY of a source device is transmitted by a transmitter TX that the interconnect interface ZPI/ZDI provides at the source end. The data signal TX_ENTRY is transferred by the transmission line (electric physical layer; EPHY) of the interconnect interface, and then is received by a receiver RX that the interconnect interface ZPI/ZDI provides at the destination end. Thus, the destination device receives the data signal TX_ENTRY.

FIG. 9A depicts the handshake communication between the source device and the transmitter TX of the ZPI/ZDI. The handshake communication enables the transmitter TX to obtain the TX transmission sequence from the source device.

First, the signal READY/ACTIVE is pulled up to indicate that the interconnect interface ZPI/ZDI indeed establishes a connection. Referring to the clock signal CLK, in T0, the source device pulls up a signal TX_REQ and, in response to the low-to-high change of TX_REQ, the transmitter TX pulls up a signal TX_ACK. The handshake behavior announces the transfer of the data signal TX_ENTRY from the source device to the transmitter TX. In T1, the signals TX_REQ and TX_ACK are pulled down, and the data is halted without being transferred from the source device. In T2 and T3, the source device pulls up the signal TX_REQ again, but the transmitter TX does not pull up the signal TX_ACK in return; it means that although the source device has prepared the data signal, the transmitter TX has not yet got ready to receive the data signal from the source device. In T4, the signals TX_REQ and TX_ACK are both high, and the source device outputs the data signal TX_ENTRY to the transmitter TX. The transmitter TX successfully receives the data signal from the source device. In T5, the status of the signals TX_REQ and TX_ACK are similar to that in T1, handshake between the source device and the transmitter TX happens again. This time, the handshake behavior announces the end of the data transfer from the source device to the interconnect interface ZPI/ZDI. In T6 and T7, the transmitter TX is ready to receive data from the source device (the signal TX_ACK is asserted), but the source device has no data (the signal TX_REQ is low).

FIG. 9B depicts the handshake communication between the receiver RX of the interconnect interface ZPI/ZDI and the destination device. According to the handshaking, the RX transmission sequence received by the receiver RX is transferred to the destination device.

First, the signal READY/ACTIVE is pulled up to indicate that the interconnect interface ZPI/ZDI indeed establishes a connection. Referring to the clock signal CLK, in T0, the receiver RX of the interconnect interface ZPI/ZDI pulls up a signal RX_REQ and, in response to the low-to-high change of RX_REQ, the destination device pulls up a signal RX_ACK. The handshake behavior announces the transfer of the data signal RX_ENTRY from the receiver RX to the destination device. In T1, the signals RX_REQ and RX_ACK are pulled down, and the data is halted without being output from the receiver RX. In T2, the receiver RX pulls up the signal RX_REQ again, but the destination device does not pull up the signal RX_ACK in return; it means that although the receiver RX has prepared the data signal, the destination device has not yet got ready to receive the data signal from the receiver RX. In T3, the signals RX_REQ and RX_ACK are both high, and the data signal RX_ENTRY that the receiver RX receives from the transmission line of the interconnect interface ZPI/ZDI is transferred to the destination device. The destination device successfully receives the data signal from the receiver RX. In T4, the status of the signals RX_REQ and RX_ACK are similar to that in T1, handshake between the receiver RX and the destination device happens again. This time, the handshake behavior announces the end of the data transfer from the interconnect interface ZPI/ZDI to the destination device. In T5 and T6, the destination device is ready to receive data from the receiver RX (the signal RX_ACK is asserted), but the receiver RX has no data (the signal RX_REQ is low). In T7, the signals RX_REQ and RX_ACK are pulled up for handshaking. Again, the handshake behavior announces the transfer of the data signal RX_ENTRY from the receiver RX to the destination device. However, the destination device may have a mechanism to refuse to receive data. For example, the destination device may refuse to receive data from the interconnect interface ZPI/ZDI in consideration of its buffer capability or other factors. In T8 and T9, the destination device pulls up the signal RX_BNT to request to block the incoming data, and the receiver RX pulls up signal RX_ACK as a response, to acknowledge the safe reception of the block request from the destination device.

Figure 10A:
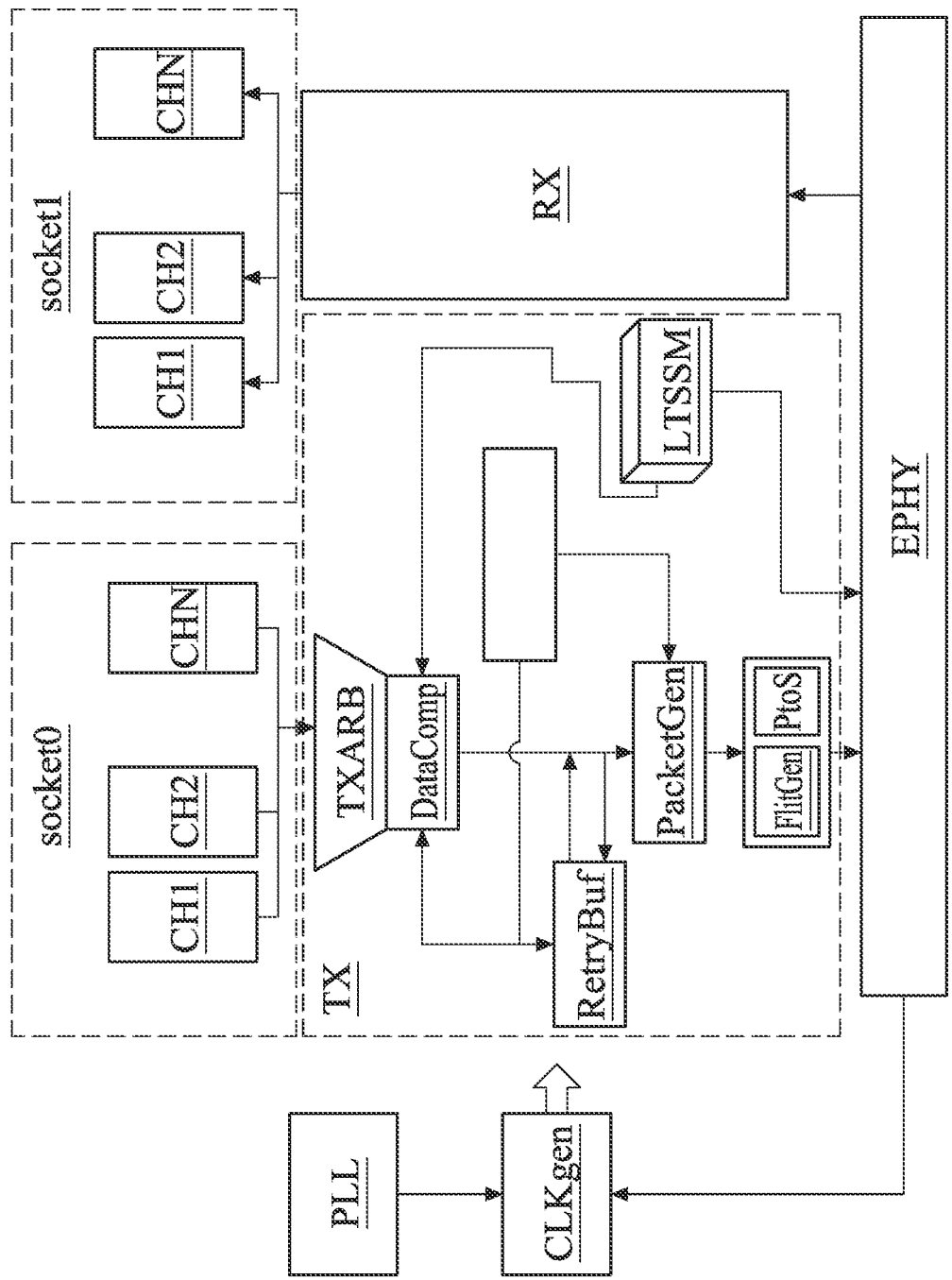
FIG. 10A and FIG. 10B illustrate the packet transmission path and the hardware architecture of ZPI between two sockets, according to an embodiment of the present disclosure.
Figure 10B:
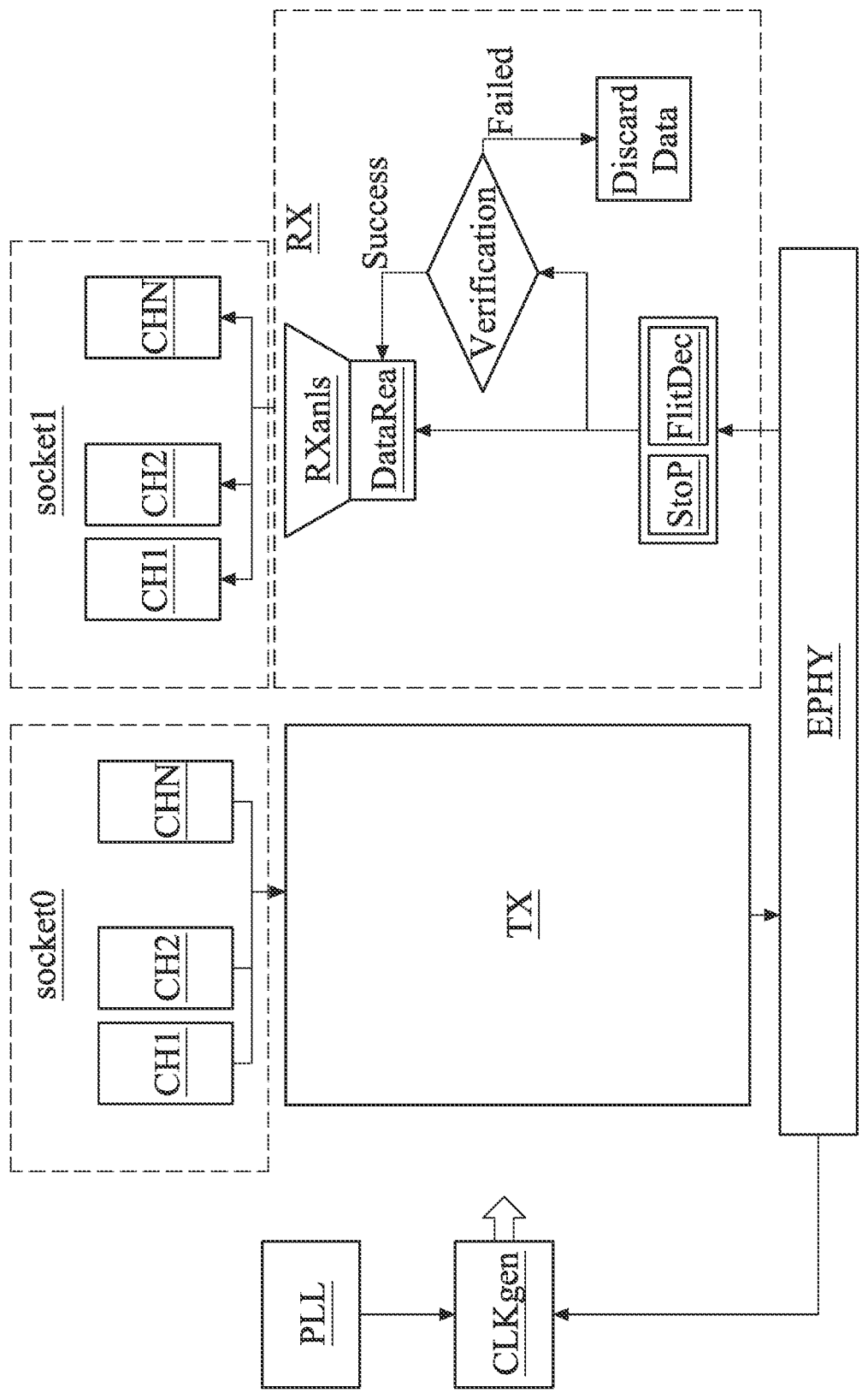

FIG. 10A and FIG. 10B illustrate the packet transmission path and the hardware architecture of ZPI between two sockets socket0 and socket1, according to an embodiment of the present disclosure. As shown, the socket socket0 is connected to a transmitter TX provided by the socket-to-socket interconnect interface ZPI. The transmitter TX transmits a data signal obtained from the socket socket0 to the electrical physical layer EPHY of the socket-to-socket interconnect interface ZPI and thereby the data signal is transferred to a receiver RX of the socket-to-socket interconnect interface ZPI. The receiver RX passes the received data signal to the socket socket1 that is at another end of the socket-to-socket interconnect interface ZPI. According to a full-duplex design, another path from socket1 to socket0 provided by the socket-to-socket interconnect interface ZPI is in the same structure. The clock signal for the socket-to-socket interconnect interface ZPI is generated by a phase-locked loop PLL and a clock generator CLKgen.

FIG. 10A depicts the details of the transmitter TX. Various types of data in the socket socket0 are sent to the arbiter TXARB of the transmitter TX, via different channels CH1~CHN, for arbitration. The data that wins the arbitration is compressed by a data compressor DataComp, and sent to the packet generator PacketGen to be packed into packets (or named flits, referring to the format 1000). When the socket socket0 does not request to transmit data, a dummy packet generator FlitGen in the socket-to-socket interconnect interface ZPI may generator empty packets by packing dummy contents for transmission. Through the parallel-to-serial converter PtoS, the packets are transferred to the receiver RX at the other end of the socket-to-socket interconnect interface ZPI via the electrical physical layer EPHY, and then delivered to the proper channel from among the channels CH1~CHN in the socket socket1 according to the data type.

The socket-to-socket interconnect interface ZPI may use pipelined hardware. Referring to the transmitter TX, when the packet generator PacketGen is packing the first batch of data, at the same time, the data compressor DataComp are compressing the second batch of data and the arbiter TXARB are performing arbitration to get the third batch of data.

The transmitter TX can back up the transmission data in a buffer RetryBuf. If the receiver RX finds that the data received from the electrical physical layer EPHY is incorrect, the retransmission mechanism is activated. The retransmission controller RetryCon gets the backup data from the buffer RetryBuf, and the packet generator PacketGen packs it into a packet again for retransmission. In an exemplary embodiment, the receiver RX of the socket socket1 issues the retransmission request, and provides the retransmission request to a transmitter TX that the socket-to-socket interconnect interface ZPI provided at the socket socket1 (the transmitter TX at the socket socket1 is not shown in FIG. 10A, and also has a retransmission controller RetryCon). As shown in FIG. 8, the transmitter TX0 and the receiver RX1 are planned at the socket socket0, and the transmitter TX1 and the receiver RX0 are planned at the socket socket1. When the receiver RX0 at the socket socket1 fails to verify the received data, the socket socket1 can output a retransmission request to be transmitted from the transmitter TX1 at the socket socket1, transferred through the electrical entity layer EPHY, and then received by the receiver RX1 at the socket socket0. According to the retransmission request, the transmitter TX0 at the socket socket0 then drives its retransmission controller RetryCon to take out the backup data from the buffer RetryBuf for retransmission.

Furthermore, there is a state machine LTSSM for controlling the transmission rate of the socket-to-socket interconnect interface ZPI. In an exemplary embodiment, the state machine LTSSM can switch the socket-to-socket interconnect interface ZPI to a lower speed state. The state machine LTSSM may suspend the arbiter TXARB and the data compressor DataComp, so that no data is input the packet generator PacketGen for packing and, accordingly, the speed of the socket-to-socket interconnect interface ZPI is reduced. The state machine LTSSM may further control the transmission rate of the electrical physical layer EPHY to achieve the speed reduction of the socket-to-socket interconnect interface ZPI. In another exemplary embodiment, the state machine LTSSM is switched to the low-speed state in response to a low power consumption setting of the socket socket0. In another exemplary embodiment, the receiver RX may have no more space to receive data. For example, the buffer in the receiver RX may be full. In this situation, the socket socket1 may send a slow-down request to the socket socket0 (via the another path not shown in the figure). According to the slow-down request from the socket socket1, the socket socket0 operates the state machine LTSSM to change the transmission rate of the socket-to-socket interconnect interface ZPI. Referring to FIG. 8, when the buffer in the receiver RX is full, the socket socket1 may output a slow-down request, which is transmitted by the transmitter TX1, and sent to the receiver RX1 through the electrical physical layer EPHY. The socket socket0 receives the slow-down request and switches the state machine LTSSM to the low-speed state. In an exemplary embodiment, the parallel-to-serial converter PtoS includes a buffer for realizing the speed reduction. When the state machine LTSSM is switched to reduce the transmission rate of the electrical physical layer EPHY, the data that cannot be transmitted to the other end yet may be temporarily stored in the buffer.

FIG. 10B depicts the details of the receiver RX. The packets received from the electrical physical layer EPHY is converted by the serial-to-parallel converter StoP, decoded by the decoder FlitDec, and verified by a verification logic module for error checking. The verification logic module may refer to the cyclic redundancy checking code CRC and forward error correction code FEC. If the verification fails, the receiver RX will ignore the received data and trigger the aforementioned retransmission mechanism. If the verification successes, the received data is rearranged by the data rearrangement module DataRea, and then distributed to the proper channel among the channels CH1 . . . CHN of the socket socket1 according an analysis of an analysis module RXanls, to complete the transmission from the socket socket0 to the socket socket1 through the socket-to-socket interconnect interface ZPI. The receiver RX may be implemented by pipelined hardware, too. When the analysis module RXanls is analyzing the first batch of data, at the same time, the data rearrangement module DataRea is rearranging the second batch of data for verification, and the decoder FlitDec is decoding the third batch of data.

Figure 11A:
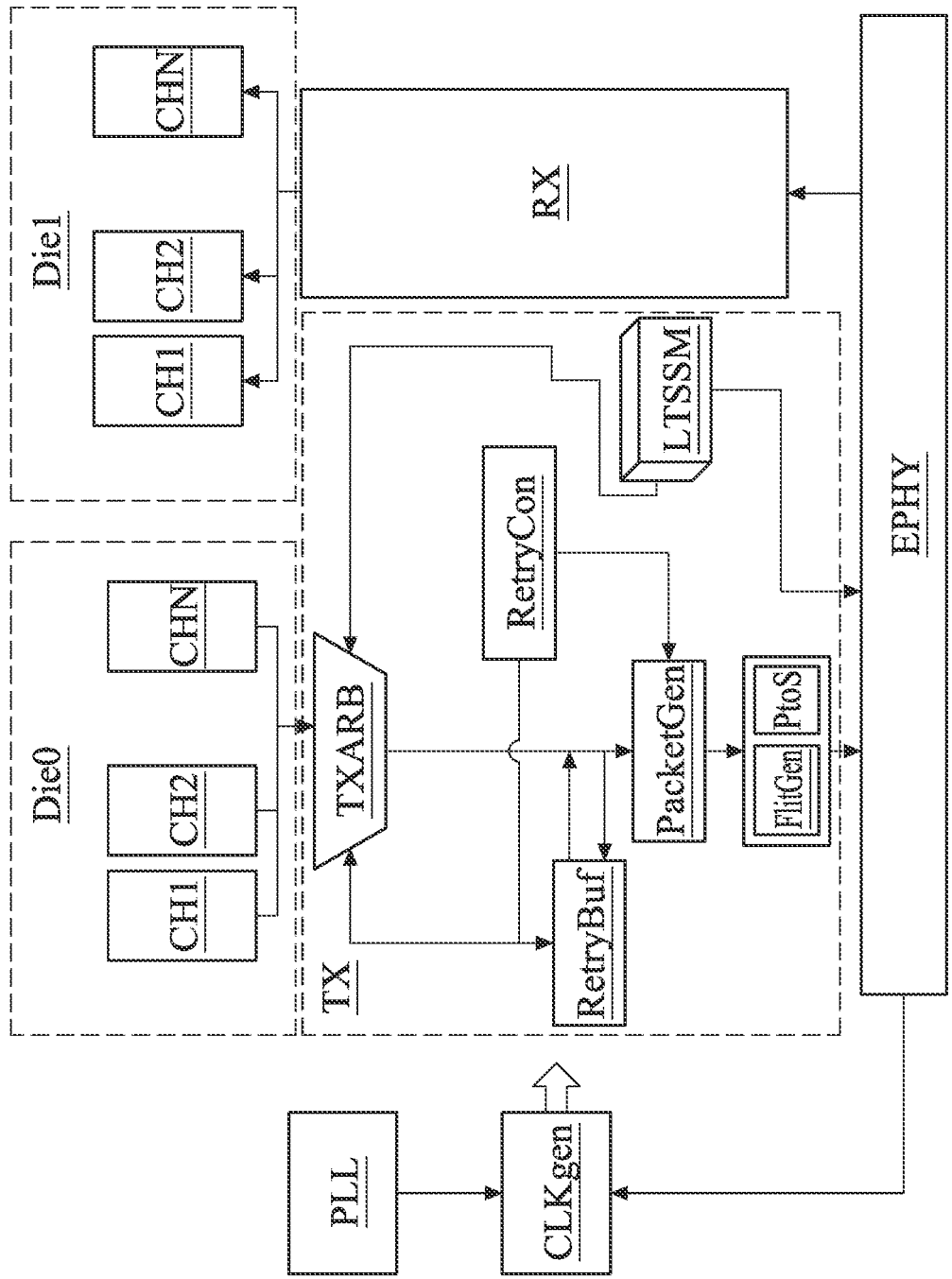
FIG. 11A and FIG. 11B illustrate the packet transmission path and the hardware architecture of ZDI between two dies, according to an embodiment of the present disclosure.
Figure 11B:
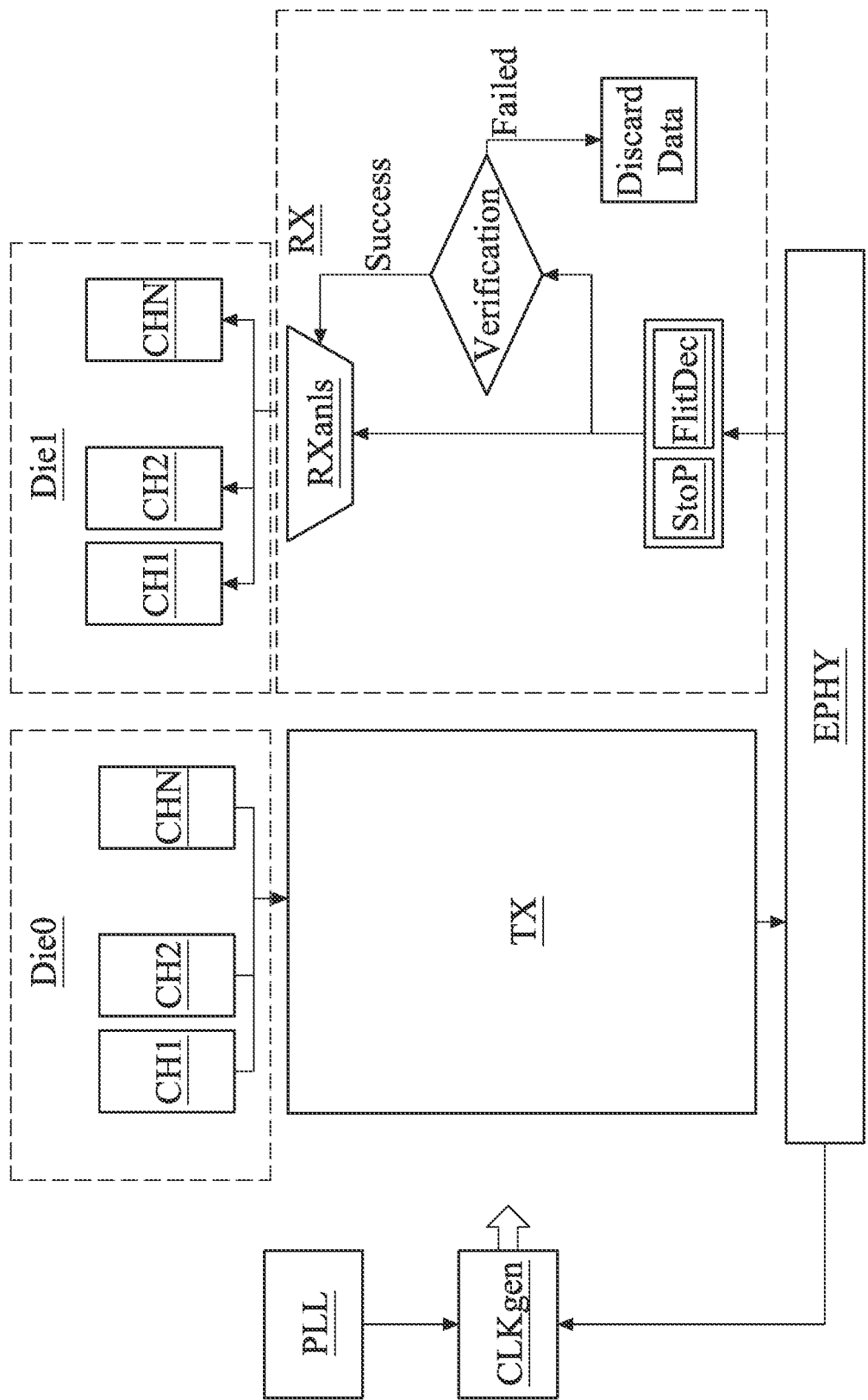

FIG. 11A and FIG. 11B illustrate the packet transmission path and the hardware architecture of ZDI between two dies Die0 and Die1, according to an embodiment of the present disclosure. Compared with the details of the transmitter TX of the socket-to-socket interconnect interface ZPI in FIG. 10A, the transmitter TX of the die-to-die interconnect interface ZDI of FIG. 11A does not require the data compressor DataComp. Compared with the details of the receiver RX of the socket-to-socket interconnect interface ZPI in FIG. 10B, the receiver RX of the die-to-die interconnect interface ZDI of FIG. 11B does not require the data rearrangement module DataRea. Furthermore, the same as those shown in FIGS. 10A and 10B, the die-to-die interconnect interface ZDI can have a verification and retransmission design and a state machine for speed reduction.

There are two kinds of packets transmitted between sockets through the ZPI. One of these two kinds of packet is referred to as the first packet while the other one is referred to as the second packet hereinafter. The packet transmitted through the ZDI is referred to as the third packet. The first packet, the second packet, and the third packet will be described in accompany with the figures.

Figure 12A:
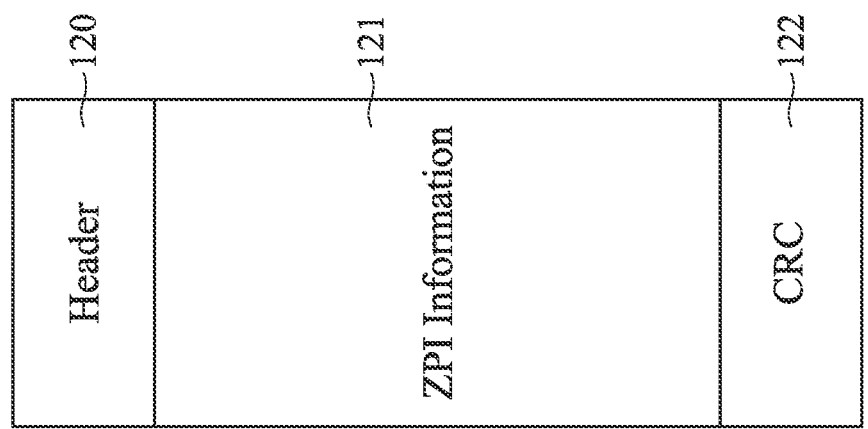
FIG. 12A is a schematic diagram of the first packet, according to an embodiment of the present disclosure.

FIG. 12A is a schematic diagram of the first packet 1200A, according to an embodiment of the present disclosure. As shown in FIG. 12A, the first packet 1200A is provided with a header 120, a ZPI information 121, and a cyclic redundancy check (CRC) code 122.

In the first packet 1200A, the ZPI information 121 is used for establishing the communication that conforms with the communication protocol of the ZPI interconnect interface between two sockets, such as the handshake communication shown in FIG. 9A and FIG. 9B. The number of bits of the ZPI information 121 may be a fixed value. The header 120 is used for indicating attributes of the ZPI information 121. The CRC code 122 is used for checking the correctness of the ZPI information 121.

Figure 12B:
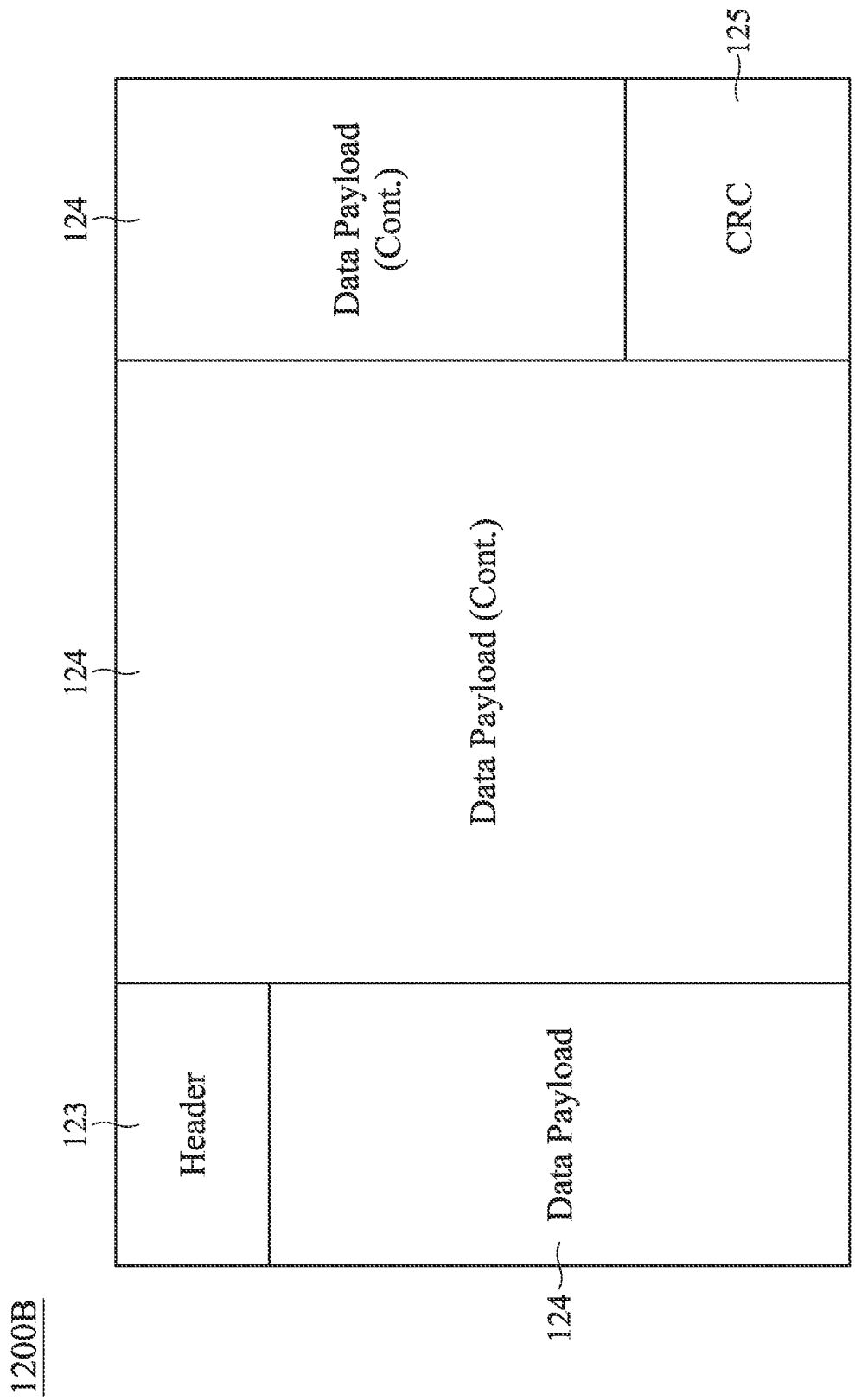
FIG. 12B is a schematic diagram of the second packet, according to an embodiment of the present disclosure.

FIG. 12B is a schematic diagram of the second packet 1200B, according to an embodiment of the present disclosure. As shown in FIG. 12, the second packet 1200B is provided with a header 123, a data payload 124, and a CRC code 125.

In the second packet 1200B, the data payload is the data loaded from a socket and transmitted to another socket, such as the request sent and the feedback data received when a CPU core in a socket access the hardware resources of another socket, or the data used for maintaining the cache coherency between sockets, as previously described. The header 120 is used for indicating attributes of the data payload 124. The CRC code 125 is used for checking the correctness of the data payload 124. The number of bits of the data payload 124 may not be a fixed value, and may be determined by the degree of congestion of the ZPI. Specifically, the number of bits of the data payload 124 is bigger when the ZPI is more congested, so that the bandwidth utilization may increase. When the ZPI is relatively not so congested, the number of bits of the data payload 124 is smaller, so that the transmission delay may decrease. In some embodiments, the degree of congestion is determined by the amount of data in the buffer of the transmitter TX of the ZPI. In other words, Specifically, the more the amount of data stored in the buffer is (meaning that the congestion is more severe), the larger the number of bits of the data payload 124 is.

Figure 13:
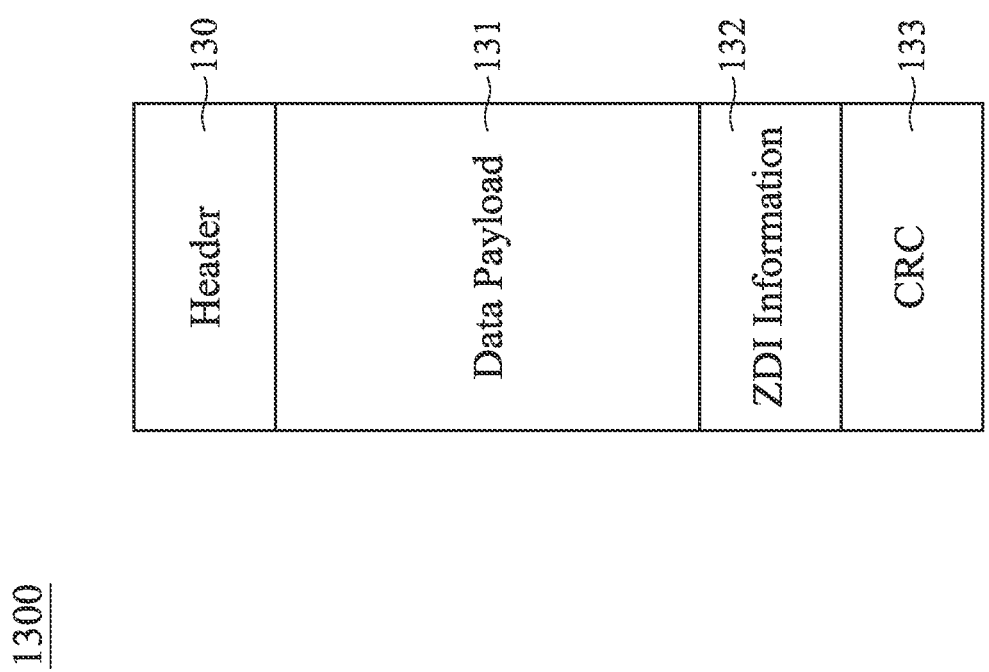
FIG. 13 is a schematic diagram of the third packet, according to an embodiment of the present disclosure.

FIG. 13 is a schematic diagram of the third packet 1300, according to an embodiment of the present disclosure. As shown in FIG. 13, the third packet 1300 is provided with a header 130, a data payload 131, a ZDI information, and a CRC code 133.

In the third packet 1300, the data payload 131 is the data loaded from die and transmitted to another die, such as the request sent and the feedback data received when a CPU core in a die access the hardware resources of another die, as previously described. The ZDI information 132 is used for establishing the communication that conforms with the communication protocol of the ZDI between two dies, such as the handshake communication shown in FIG. 9A and FIG. 9B. The number of bits of the ZDI information 132 may be fixed. The header 130 is used for indicating attributes of the data payload 131 and the ZDI information 132. The CRC code 133 is used for checking the correctness of the ZDI information 132.

The header 123 in FIG. 12B and the header 130 in FIG. 13 may use 5 bits for example (the present disclosure is not limited hereto) to indicate attributes of the data payload transmitted. <Table I> below shows an example of various header corresponding to attributes of the data payload.

TABLE 1

| Header | Description |
|--------|-------------|
| 1_**** | TLP enable, which means that the data payload is taken from the data signal TX_Entry |
| 0_**** | TLP disable, which means that the data payload is dummy |

TABLE 1-continued

| Header | Description |
|---|---|
| | data generated by the interconnect interface ZPI/ZDI rather than the data taken from the data signal TX_Entry. |
| *_000* | ACK/NAK DLLP, operative to transfer a retry request. |
| *_01** | FCI/FCU DLLP, operative to return the buffer status of the receiver RX. |
| *_1000 | PM related DLLP, for power management. |
| *_1100 | DLLP disable, indicating that the packet contents do not contain valid data. |
| 1_1111 | Reserved for PHY, operative to transfer a start, ending, or idle flag of the transmission. |

In summary, the packets transmitted between sockets through the ZPI and the packets transmitted between dies through the ZDI may be different from two aspects. Firstly, in the packets transmitted between sockets through the ZPI, the data payload and the ZPI information are encoded and transmitted individually, as the first packet 1200A in FIG. 12A and the second packet 1200B in FIG. 12B shows. However, in the packets transmitted between dies through the ZDI, the data payload and the ZDI information are encoded and transmitted together, as the third packet 1300 in FIG. 13. Secondly, in the packets transmitted between dies through the ZDI, the number of bits of the data payload may be a fixed value. However, in the packets transmitted between sockets through the ZPI, the number of bits of the data payload may be determined by the degree of congestion of the ZPI. Thus, the bandwidth utilization may increase when the ZPI is more congested, and the transmission delay may decrease when the ZPI is less congested.

Ordinal terms used in the claims, such as "first," "second," "third," etc., are used to modify the elements appearing in the claims, and do not imply any prioritization, precedence relation, or a component is higher than the other component, or the chronological order in which the method steps are performed. The intention is to make a distinction between elements with the same name.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A interconnect system, comprising a plurality of sockets and a first interconnect interface, wherein any two of the sockets are accessible to each other's hardware resources by transmitting a first packet and a second packet through the first interconnect interface;
    wherein the first packet comprises first interconnect information, configured for establishing communication that conforms with a communication protocol of the first interconnect interface between any two of the sockets;
    wherein the second packet comprises a first data payload, the first data payload is data loaded from one of the sockets and transmitted to another one;
    wherein the sockets comprise a first socket and a second socket, configured to be interconnected with each other through the first interconnect interface; and
    wherein the number of bits of the first data payload when the first interconnect interface is congested is bigger than the number of bits of the first data payload when the first interconnect interface is not congested.

2. The interconnect system as claimed in claim 1, wherein the first packet further comprises:
    a first header, configured for indicating attributes of the first interconnect information;
    a check code, configured for checking correctness of the first interconnect information.

3. The interconnect system as claimed in claim 1, wherein number of bits of the first interconnect information is fixed.

4. The interconnect system as claimed in claim 1, wherein the second packet further comprises:
    a second header, configured for indicating attributes of the first data payload;
    a second check code, configured for checking the correctness of the first data payload.

5. The interconnect system as claimed in claim 1, wherein each of the plurality of sockets comprises a plurality of dies and a second interconnect interface, wherein any two of the dies are accessible to each other's hardware resources by transmitting a third packet through the second interconnect interface; and
    wherein the dies comprise a first die and a second die, and the first die and the second die are configured to be interconnected with each other through the second interconnect interface; and
    wherein the third packet comprises:
    second interconnect information, configured for establishing communication between any two of the dies; and
    a second data payload, loaded from one of the dies.

6. The interconnect system as claimed in claim 5, wherein the third packet comprises:
    a third header, configured for indicating attributes of the second data payload and the second interconnect information;
    a third check code, configured for checking the correctness of the second data payload and the second interconnect information.

7. The interconnect system as claimed in claim 5, wherein the number of bits of the second data payload and number of bits of the second interconnect information are fixed.

8. The interconnect system as claimed in claim 1, wherein the hardware resources comprise a last-level cache (LLC); and
    wherein the first packet and the second packet are configured for maintaining cache coherency between the LLCs of any two sockets.

9. The interconnect system as claimed in claim 1, wherein the plurality of sockets further comprise a third socket; and
    wherein the first socket and the third socket are configured to be interconnected with each other through the first interconnect interface; and
    wherein the second socket and the third socket are configured to be interconnected with each other through the first interconnect interface.

10. The interconnect system as claimed in claim 1, wherein the sockets further comprise a third socket and a fourth socket; and wherein the first socket and the third socket are configured to be interconnected with each other through the first interconnect interface; and wherein the second socket and the fourth socket are configured to be interconnected with each other through the first interconnect interface;

wherein the first socket, the second socket, the third socket, and the fourth socket are all on a first plane.

11. The interconnect system as claimed in claim 10, wherein the first socket and the fourth socket are configured to be interconnected with each other through the first interconnect interface; and wherein the second socket and the third socket are configured to be interconnected with each other through the first interconnect interface.

12. The interconnect system as claimed in claim 10, wherein the plurality of sockets further comprise a fifth socket and a sixth socket; and wherein the first socket and the fifth socket are configured to be interconnected with each other through the first interconnect interface; and wherein the fourth socket and the fifth socket are configured to be interconnected with each other through the first interconnect interface; and wherein the fifth socket and the sixth socket are configured to be interconnected with each other through the first interconnect interface; and wherein the second socket and the sixth socket are configured to be interconnected with each other through the first interconnect interface; and wherein the third socket and the sixth socket are configured to be interconnected with each other through the first interconnect interface; and wherein the fifth socket is on a second plane, and the sixth socket is on a third plane; and wherein the first plane, the second plane, and the third plane are parallel with one another, and the first plane is between the second plane and the third plane.

13. The interconnect system as claimed in claim 10, wherein the plurality of sockets further comprise a fifth socket, a sixth socket, a seventh socket, and an eighth socket; and wherein the fifth socket and the sixth socket are configured to be interconnected with each other through the first interconnect interface; and wherein the fifth socket and the seventh socket are configured to be interconnected with each other through the first interconnect interface; and wherein the sixth socket and the eighth socket are configured to be interconnected with each other through the first interconnect interface; and wherein the seventh socket and the eighth socket are configured to be interconnected with each other through the first interconnect interface; and wherein the first socket and the fifth socket are configured to be interconnected with each other through the first interconnect interface; and wherein the second socket and the sixth socket are configured to be interconnected with each other through the first interconnect interface; and wherein the third socket and the seventh socket are configured to be interconnected with each other through the first interconnect interface; and wherein the fourth socket and the eighth socket are configured to be interconnected with each other through the first interconnect interface; and wherein the fifth socket, the sixth socket, the seventh socket, and the eighth socket are all on a second plane, and the second plane is parallel with the first plane.

14. A interconnect system, comprising a plurality of modules and a first interconnect interface, wherein any two of the modules are accessible to each other's hardware resources by transmitting a first packet and a second packet through the first interconnect interface;

wherein the modules are dies or chiplets;

wherein the first packet comprises first interconnect information, configured for establishing communication that conforms with a communication protocol of the first interconnect interface between any two of the modules;

wherein the second packet comprises a first data payload, the first data payload is data loaded from one of the modules and transmitted to another one; and wherein the modules comprise a first module and a second module, configured to be interconnected with each other through the first interconnect interface; and wherein the number of bits of the first data payload when the first interconnect interface is congested is bigger than the number of bits of the first data payload when the first interconnect interface is not congested.

15. The interconnect system as claimed in claim 14, wherein the first packet further comprises:

a first header, configured for indicating attributes of the first interconnect information; and a check code, configured for checking the correctness of the first interconnect information.

16. The interconnect system as claimed in claim 14, wherein the number of bits of the first interconnect information is fixed.

17. The interconnect system as claimed in claim 14, wherein the second packet further comprises:

a second header, configured for indicating attributes of the first data payload; and a second check code, configured for checking the correctness of the first data payload.

18. The interconnect system as claimed in claim 14, wherein the hardware resources comprise a last-level cache (LLC); and wherein the first packet and the second packet are configured for maintaining cache coherency between the LLCs of any two modules.

19. The interconnect system as claimed in claim 14, wherein the modules further comprise a third module; and wherein the first module and the third module are configured to be interconnected with each other through the first interconnect interface; and wherein the second module and the third module are configured to be interconnected with each other through the first interconnect interface.

20. The interconnect system as claimed in claim 14, wherein the modules further comprise a third module and a fourth module; and wherein the first module and the third module are configured to be interconnected with each other through the first interconnect interface; and wherein the second module and the fourth module are configured to be interconnected with each other through the first interconnect interface;

wherein the first module, the second module, the third module, and the fourth module are all on a first plane.

21. The interconnect system as claimed in claim 18, wherein the first module and the fourth module are configured to be interconnected with each other through the first interconnect interface; and wherein the second module and the third module are configured to be interconnected with each other through the first interconnect interface.

22. The interconnect system as claimed in claim 18, wherein the modules further comprise a fifth module and a sixth module; and
    wherein the first module and the fifth module are configured to be interconnected with each other through the first interconnect interface; and
    wherein the fourth module and the fifth module are configured to be interconnected with each other through the first interconnect interface; and
    wherein the fifth module and the sixth module are configured to be interconnected with each other through the first interconnect interface; and
    wherein the second module and the sixth module are configured to be interconnected with each other through the first interconnect interface; and
    wherein the third module and the sixth module are configured to be interconnected with each other through the first interconnect interface; and
    wherein the fifth module is on a second plane, and the sixth module is on a third plane; and
    wherein the first plane, the second plane, and the third plane are parallel with one another, and the first plane is between the second plane and the third plane.

23. The interconnect system as claimed in claim 18, wherein the modules further comprise a fifth module, a sixth module, a seventh module, and an eighth module; and
    wherein the fifth module and the sixth module are configured to be interconnected with each other through the first interconnect interface; and
    wherein the fifth module and the seventh module are configured to be interconnected with each other through the first interconnect interface; and
    wherein the sixth module and the eighth module are configured to be interconnected with each other through the first interconnect interface; and
    wherein the seventh module and the eighth module are configured to be interconnected with each other through the first interconnect interface; and
    wherein the first module and the fifth module are configured to be interconnected with each other through the first interconnect interface; and
    wherein the second module and the sixth module are configured to be interconnected with each other through the first interconnect interface; and
    wherein the third module and the seventh module are configured to be interconnected with each other through the first interconnect interface; and
    wherein the fourth module and the eighth module are configured to be interconnected with each other through the first interconnect interface; and
    wherein the fifth module, the sixth module, the seventh module, and the eighth module are all on a second plane, and the second plane is parallel with the first plane.

* * * * *